United States Patent
Wu et al.

(10) Patent No.: US 9,900,807 B2
(45) Date of Patent: Feb. 20, 2018

(54) CIRCUIT SWITCHED FALLBACK METHOD AND DEVICE

(71) Applicant: HUAWEI TECHNOLOGIES CO., LTD., Shenzhen (CN)

(72) Inventors: Xiaobo Wu, Shanghai (CN); Hai Liu, Shanghai (CN); Daliang Zhang, Shanghai (CN); Xinyong Wang, Shenzhen (CN); Yaowei Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 14/966,461

(22) Filed: Dec. 11, 2015

(65) Prior Publication Data
US 2016/0100337 A1    Apr. 7, 2016

Related U.S. Application Data

(63) Continuation of application No. PCT/CN2013/077187, filed on Jun. 13, 2013.

(51) Int. Cl.
*H04W 36/00* (2009.01)
*H04L 29/06* (2006.01)

(52) U.S. Cl.
CPC ..... *H04W 36/0022* (2013.01); *H04L 65/1096* (2013.01)

(58) Field of Classification Search
CPC . H04W 36/00; H04W 36/0022; H04W 36/14; H04W 36/02; H04L 29/06; H04L 65/1096
See application file for complete search history.

(56) References Cited

U.S. PATENT DOCUMENTS 8,792,417 B2 * 7/2014 Yeoum .............. H04W 36/0022
                                                            310/331
9,332,460 B2 * 5/2016 Lee .................... H04W 36/0022
(Continued)

FOREIGN PATENT DOCUMENTS

CN          101662806 A      3/2010
CN          101848427 A      9/2010
(Continued)

OTHER PUBLICATIONS

Extended European Search Report dated Mar. 29, 2016 in corresponding European Patent Application No. 13886974.8.
International Search Report dated Mar. 13, 2014 in corresponding International Patent Application No. PCT/CN2013/077187.
"$3^{rd}$ Generation Partnership Project; Technical Specification Group Services and System Aspects; Circuit Switched (CS) fallback in Evolved Packet System (EPS); Stage 2 (Release 11)", 3GPP TS 23.272 V11.0.0, Mar. 2012, Valbonne, France, 87 pages.
(Continued)

*Primary Examiner* — Tri H Phan
(74) *Attorney, Agent, or Firm* — Staas & Halsey LLP

(57) ABSTRACT

The embodiments of the present application discloses a circuit switched fallback method, a UE, an MSC, and an MME. The method includes: sending, by a UE to an MME, a request message for requesting to perform CSFB; receiving, by the UE, a switch command sent by an eNodeB; releasing or holding a default CS call of the UE after the UE switches to the CS domain according to the switch command, where the default CS call is generated by the UE according to the switch command; and by using an MSC, initiating, by the UE, a CS call or receiving a CS call. According to the circuit switched fallback method, the UE, the MSC, and the MME in the embodiments of the present application, circuit switched fallback can be implement in a manner of switching by a UE from a PS domain to a CS domain, and reduce a delay.

13 Claims, 13 Drawing Sheets

(56) References Cited

U.S. PATENT DOCUMENTS

| | | | |
|---|---|---|---|
| 9,648,522 B2* | 5/2017 | Wu | H04W 36/0022 |
| 9,717,028 B2* | 7/2017 | Wu | H04W 36/14 |
| 9,775,075 B2* | 9/2017 | Aghili | H04W 68/005 |
| 2011/0170517 A1 | 7/2011 | Bakker et al. | |
| 2012/0069731 A1* | 3/2012 | Tooher | H04W 76/026 370/221 |
| 2012/0087340 A1 | 4/2012 | Yang et al. | |
| 2012/0115489 A1 | 5/2012 | Shuai et al. | |
| 2012/0122459 A1* | 5/2012 | Wu | H04W 36/0022 455/437 |
| 2012/0231793 A1 | 9/2012 | Wu | |
| 2013/0100932 A1* | 4/2013 | Yu | H04W 48/18 370/331 |
| 2013/0163560 A1* | 6/2013 | Diachina | H04W 36/0022 370/331 |
| 2013/0195009 A1* | 8/2013 | Ramle | H04W 36/0022 370/328 |
| 2013/0287007 A1* | 10/2013 | Wu | H04W 36/0022 370/331 |
| 2014/0133401 A1* | 5/2014 | Kaura | H04W 36/0022 370/328 |
| 2015/0282011 A1* | 10/2015 | Watfa | H04W 36/0022 370/332 |
| 2015/0296420 A1* | 10/2015 | Drevon | H04W 48/18 455/436 |
| 2015/0365851 A1* | 12/2015 | Wang | H04W 36/0022 455/439 |
| 2016/0100338 A1* | 4/2016 | Wu | H04W 36/0022 370/331 |
| 2016/0105832 A1* | 4/2016 | Wu | H04W 36/14 455/439 |
| 2016/0219465 A1 | 7/2016 | Lei | |

FOREIGN PATENT DOCUMENTS

| | | |
|---|---|---|
| JP | 2012-533241 | 12/2012 |
| JP | 2013-501388 | 1/2013 |

OTHER PUBLICATIONS

"SRVCC Enhancement with Voice Media Anchoring in SGW/PGW.", 3GPP TSG SA WG2 Meeting #76, Nov. 16-20, 2009, Cabo, Mexico, 6 pages.

"CSFB optimization based on SRVCC", 3GPP TSG-SA WG2 Meeting #75, Aug. 31-Sep. 4, 2009, Kyoto, Japan, 12 pages.

"3rd Generation Partnership Project; Technical Specification Group Core Network and Terminals; Mobile radio interface Layer 3 specification; Core network protocols; Stage 3 (Release 12)", 3GPP TS 24.008 V12.1.0, Mar. 2013, Valbonne, France, 679 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, Valbonne, France, 290 pages.

"3rd Generation Partnership Project; Technical Specification Group Services and System Aspects; Circuit Switched (CS) fallback in Evolved Packet System (EPS); Stage 2 (Release 11)",3GPP TS 23.272 V11.4.0, Mar. 2013, Valbonne, France, 91 pages.

"3rd Generation Partnership Project; Technical Specification Group Services and System Aspects; Intra-domain connection of Radio Access Network (RAN) nodes to multiple Core Network (CN) nodes (Release 11)", 3GPP TS 23.236 V11.0.0, Sep. 2012, Valbonne, France, 40 pages.

"3rd Generation Partnership Project; Technical Specification Group Services and System Aspects; Single Radio Voice Call Continuity (SRVCC); Stage 2 (Release 11)", 3GPP TS 23.216 V11.8.0, Mar. 2013, Valbonne, France, 67 pages.

International Search Report dated Mar. 13, 2014, in corresponding International Application No. PCT/CN2013/077187.

Japanese Office Action dated Jun. 20, 2017 in corresponding Japanese Patent Application No. 2016-518815, 8 pages.

Huawei, Overview of Single Radio Voice Call Continuity from UTRAN/GERAN to E-UTRAN/HSPA, 3GPP TSG-RAN WG3 #73bis R3-112338, Oct. 19, 2011, 5 pages (retrieved on Jun. 13, 2017).

* cited by examiner

200

```
┌─────────────────────────────────────────────────────┐
│ An MSC receives a switch request that is sent by an │
│ MME and used to request to switch a UE from a PS to │
│ a CS domain, where the switch request carries CSFB  │      S210
│ indication information, and the CSFB indication     │
│ information indicates that the switch request is    │
│ sent by the MME when the MME receives a request     │
│ message that is sent by the UE and used to request  │
│ to perform CSFB                                     │
└─────────────────────────────────────────────────────┘
```

The MSC receives a switch request that is sent by an MME and used to request to switch a UE from a PS domain to a CS domain, where the switch request carries CSFB indication information, and the CSFB indication information indicates that the switch request is sent by the MME when the MME receives a request message that is sent by the UE and used to request to perform CSFB — S210

The MSC sends a switch response message to the MME according to the switch request — S220

The MSC receives a switch completion message sent by the UE, where the switch completion message indicates that the UE has already completed switch from the PS domain to the CS domain — S230

The MSC receives a call release message or a call hold message, where the call release message or the call hold message is sent by the UE, and the call release message or the call hold message instructs the MSC to release or hold a default CS call — S260

The MSC releases or holds the default CS call according to the CSFB indication information and the call release message or the call hold message — S241

The MSC interacts with the UE, so that the UE initiates a CS call or receives a CS call — S250

| An MSC receives a switch request that is sent by an MME and used to request to switch a UE from a PS domain to a CS domain, where the switch request carries CSFB indication information, and the CSFB indication information indicates that the switch request is sent by the MME when the MME receives a request message that is sent by the UE and used to request to perform CSFB | S210 |

↓

| The MSC sends a switch response message to the MME according to the switch request | S220 |

↓

| The MSC receives a switch completion message sent by the UE, where the switch completion message indicates that the UE has already completed switch from the PS domain to the CS domain | S230 |

↓

| The MSC releases or holds a default CS call according to the CSFB indication information, where the default CS call is generated by the MSC after the MSC receives the switch request message | S240 |

↓

| The MSC sends a call release message or a call hold message to the UE, where the call release message or the call hold message instructs the UE to release or hold a default CS call generated by the UE | S270 |

↓

| The MSC interacts with the UE, so that the UE initiates a CS call or receives a CS call | S250 |

FIG. 7

CIRCUIT SWITCHED FALLBACK METHOD AND DEVICE

CROSS-REFERENCE TO RELATED APPLICATIONS

This application is a continuation of International Application No. PCT/CN2013/077187, filed on Jun. 13, 2013, which is hereby incorporated by reference in the entirety.

TECHNICAL FIELD

The present application relates to the field of communications, and in particular, to a circuit switched fallback method, a user equipment (UE), a mobile switching center (MSC), and a mobility management entity (MME).

BACKGROUND

With the deployment over the years, it may be considered that 2G/3G networks provide full coverage to some extent. As System Architecture Evolution (SAE)/Long Term Evolution (LTE), High Speed Packet Access (HSPA), HSPA+, and Worldwide Interoperability for Microwave Access (WiMAX) network technologies develop, these networks have already cover some urban areas and traffic hotspots. Consequently, in a current communications network, these networks coexist with the 2G/3G networks. For ease of description, SAE/LTE, HSPA, HSPA+, WiMAX, and the like that provide only a packet switched (PS) domain are collectively referred to as PS domain-only networks. For different network bearer mechanisms, voice calls of mobile communication may be classified into the following several types:

A first type is a conversational service borne by a circuit switched (CS) domain, such as a voice call.

A second type is a conversational service home by a PS domain, which is also referred to as a Voice over Internet Protocol (Internet Protocol, IP) (Voice over Internet Protocol, VoIP) service, and quality of service (Quality of Service, QoS) is ensured by an Internet Protocol (Internet Protocol, IP) multimedia subsystem (IP Multimedia Subsystem, IMS), such as a voice call over IP.

With regard to a PS domain-only network, a voice call can be transmitted on only a PS domain bearer of the PS domain-only network, and an IMS controls the voice call by using an IP-based network. On a 2G/3G network, a voice call is generally borne in a CS domain.

In an early stage of LTE deployment, an operator can provide a voice service for a user by using a 2G/3G network and provide a data service for a user by using an LTE network. A terminal is a multi-mode terminal; however, because of complex implementation and consideration of costs, most terminals cannot simultaneously send and receive an LTE signal and a 2G/3G signal, which is solved in the prior art by using a circuit switched fallback (CS fallback, CSFB) technology. In a scenario, a UE performs a data service or is in an idle state on an LTE network, and in this case, to initiate a CS voice call, the UE needs to switch a wireless module of the UE from LTE to 2G/3G, and then the UE initiates a voice call on the 2G/3G. This call is referred to as a call initiated by the UE (MOC, mobile originating call). In another scenario, a UE performs a data service or is in an idle state on an LTE network, and in this case, a user needs to call the UE, and the LTE network needs to be capable of notifying the UE that a CS call arrives, so that the UE can switch a wireless module to 2G/3G to receive the CS call. This call is referred to as a call in which the UE is a callee (MTC, mobile terminating call).

When combined registration is performed by using an interface SGs between an MME and an MSC server, it can be implemented that the UE is registered, by using the MME, with an MSC while being attached to the LTE. Subsequently, the UE can initiate a CS service after falling back to a CS domain. The prior art for the UE to fall back to the CS domain includes: packet switched (PS) domain switch, network assisted cell change (NACC), and radio resource control release (RRC release).

The prior art does not provide a technical solution in which a UE initiates a CS call or receives a CS call after falling back to a circuit switched domain by switching from a PS domain to the CS domain.

SUMMARY

Embodiments of the present application provide a circuit switched fallback method, a UE, an MSC, and an MME, so that circuit switched fallback is implemented in a manner of switching by UE from a PS domain to a CS domain.

According to a first aspect, a circuit switched fallback method is provided, including: sending, by a user equipment UE to a mobility management entity MME, a request message for requesting to perform circuit switched fallback CSFB; receiving, by the UE, a switch command sent by an evolved base station (eNodeB), where the switch command instructs the UE to switch from a packet switched PS domain to a circuit switched CS domain; releasing or holding a default CS call of the UE after the UE switches to the CS domain according to the switch command, where the default CS call is generated by the UE according to the switch command; and by using a mobile switching center MSC, initiating, by the UE, a CS call or receiving a CS call.

In a first possible implementation manner, the method further includes: sending, by the UE, a call release message or a call hold message to the MSC, where the call release message or the call hold message instructs the MSC to release or hold a default CS call that is generated by the MSC in a switch preparation process.

In a second possible implementation manner, before the releasing or holding a default CS call of the UE, the method further includes: receiving, by the UE, a call release message or a call hold message, where the call release message or the call hold message is sent by the MSC, and the call release message or the call hold message instructs the UE to release or hold the default CS call; and the releasing or holding a default CS call of the UE includes: releasing or holding, by the UE, the default CS call according to the call release message or the call hold message.

With reference to the first aspect or the first or second possible implementation manner of the first aspect, in a third possible implementation manner, before the sending, by a user equipment UE to a mobility management entity MME, a request message for requesting to perform circuit switched fallback CSFB, the method further includes: sending, by the UE to the MME, a voice coding/decoding capability and a single radio voice call continuity (Single Radio Voice Call Continuity, SRVCC) capability that are supported by the UE.

According to a second aspect, a circuit switched fallback method is provided, including: receiving, by a mobile switching center MSC, a switch request that is sent by a mobility management entity MME and used to request to switch a user equipment UE from a packet switched PS domain to a circuit switched CS domain, where the switch request carries circuit switched fallback CSFB indication information, and the CSFB indication information indicates that the switch request is sent by the MME when the MME receives a request that is sent by the UE and used to request to perform CSFB; sending, by the MSC, a switch response message to the MME according to the switch request; receiving, by the MSC, a switch completion message sent by the UE, where the switch completion message indicates that the UE has already completed switch from the PS domain to the CS domain; releasing or holding, by the MSC, a default CS call according to the CSFB indication information, where the default CS call is generated by the MSC after the MSC receives the switch request message; and interacting, by the MSC, with the UE, so that the UE initiates a CS call or receives a CS call.

In a first possible implementation manner, before the releasing or holding a default CS call, the method further includes: receiving, by the MSC, a call release message or a call hold message, where the call release message or the call hold message is sent by the UE, and the call release message or the call hold message instructs the MSC to release or hold the default CS call; and the releasing or holding a default CS call includes: releasing or holding, by the MSC, the default CS call according to the CSFB indication information and the call release message or the call hold message.

In a second possible implementation manner, the method further includes: sending, by the MSC, a call release message or a call hold message to the UE, where the call release message or the call hold message instructs the UE to release or hold a default CS call generated by the UE.

With reference to the second aspect or the first or second possible implementation manner of the second aspect, in a third possible implementation manner, the CSFB indication information is a preconfigured session transfer number-a single receiver for SRVCC (Session Transfer Number-Single Radio, STN-SR).

According to a third aspect, a circuit switched fallback method is provided, including: receiving, by a mobility management entity MME, a request message that is sent by a user equipment UE and used to request to perform circuit switched fallback CSFB; sending, by the MME, an S1 interface message to an evolved base station eNodeB, where the S1 interface message instructs the eNodeB to switch the UE from a packet switched PS domain to a circuit switched CS domain; receiving, by the MME, a first switch request that is sent by the eNodeB and used to switch the UE from the PS domain to the CS domain; sending, by the MME to an MSC, a second switch request for switching the UE from the PS domain to the CS domain, where the second switch request carries second CSFB indication information, and the second CSFB indication information indicates that the second switch request is sent to perform the CSFB; receiving, by the MME, a switch response message sent by the MSC; and sending, by the MME, a first switch command to the eNodeB, so that after the eNodeB receives the first switch command, the eNodeB sends a second switch command to the UE, where the second switch command instructs the UE to switch from the PS domain to the CS domain, so that after the UE switches to the CS domain according to the second switch command, the UE releases or holds a default CS call that is generated by the UE according to the second switch command.

In a first possible implementation manner, the second CSFB indication information is a preconfigured STN-SR.

With reference to the third aspect or the first possible implementation manner of the third aspect, in a second possible implementation manner, the first switch request carries first CSFB indication information, and the first CSFB indication information indicates that the first switch request message is sent to perform the CSFB.

With reference to the second possible implementation manner of the third aspect, in a third possible implementation manner, the first CSFB indication information is SRVCC switch indication information.

With reference to the third aspect or any one possible implementation manner of the first to third possible implementation manners of the third aspect, in a fourth possible implementation manner, before the receiving, by a mobility management entity MME, a request message that is sent by a user equipment UE and used to request to perform circuit switched fallback CSFB, the method further includes: receiving, by the MME, a voice coding/decoding capability and an SRVCC capability that are sent by the UE and supported by the UE.

According to a fourth aspect, a user equipment UE is provided, including: a sending module, configured to send, to a mobility management entity MME, a request message for requesting to perform circuit switched fallback CSFB; a receiving module, configured to receive a switch command sent by an evolved base station eNodeB, where the switch command instructs the UE to switch from a packet switched PS domain to a circuit switched CS domain; a processing module, configured to release or hold a default CS call of the UE after the UE switches to the CS domain according to the switch command, where the default CS call is generated by the UE according to the switch command; and a call module, configured to, by using a mobile switching center MSC, initiate a CS call or receive a CS call.

In a first possible implementation manner, the sending module is further configured to send a call release message or a call hold message to the MSC, where the call release message or the call hold message instructs the MSC to release or hold a default CS call that is generated by the MSC in a switch preparation process.

In a second possible implementation manner, the receiving module is further configured to receive a call release message or a call hold message, where the call release message or the call hold message is sent by the MSC, and the call release message or the call hold message instructs the UE to release or hold the default CS call; and the processing module is specifically configured to release or hold the default CS call according to the call release message or the call hold message.

With reference to the fourth aspect or the first or second possible implementation manner of the fourth aspect, in a third possible implementation manner, the sending module is further configured to: before sending, to the mobility management entity MME, the request message for requesting to perform the circuit switched fallback CSFB, send a supported voice coding/decoding capability and a supported single radio voice call continuity SRVCC capability to the MME.

According to a fifth aspect, a mobile switching center MSC is provided, including: a receiving module, configured to receive a switch request that is sent by a mobility management entity MME and used to request to switch a user equipment UE from a packet switched PS domain to a circuit switched CS domain, where the switch request carries circuit switched fallback CSFB indication information, and the CSFB indication information indicates that the switch request is sent by the MME when the MME receives a request message that is sent by the UE and used to request to perform CSFB; a sending module, configured to send a switch response message to the MME according to the switch request; where the receiving module is further configured to receive a switch completion message sent by the UE, where the switch completion message indicates that the UE has already completed switch from the PS domain to the CS domain; a processing module, configured to release or hold a default CS call according to the CSFB indication information, where the default CS call is generated by the MSC after the MSC receives the switch request message; and a call module, configured to interact with the UE, so that the UE initiates a CS call or receives a CS call.

In a first possible implementation manner, the receiving module is further configured to receive a call release message or a call hold message, where the call release message or the call hold message is sent by the UE, and the call release message or the call hold message instructs the MSC to release or hold the default CS call; and the processing module is specifically configured to release or hold the default CS call according to the CSFB indication information and the call release message or the call hold message.

In a second possible implementation manner, the sending module is further configured to send a call release message or a call hold message to the UE, where the call release message or the call hold message instructs the UE to release or hold a default CS call generated by the UE.

With reference to the fifth aspect or the first or second possible implementation manner of the fifth aspect, in a third possible implementation manner, the CSFB indication information is a preconfigured STN-SR.

According to a sixth aspect, a mobility management entity MME is provided, including: a receiving module, configured to receive a request message that is sent by a user equipment UE and used to request to perform circuit switched fallback CSFB; a determining module, configured to determine to switch the UE from a packet switched PS domain to a circuit switched CS domain; and a sending module, configured to send an S1 interface message to an evolved base station eNodeB, where the S1 interface message instructs the eNodeB to switch the UE from the PS domain to the CS domain; where the receiving module is further configured to receive a first switch request that is sent by the eNodeB and used to switch the UE from the PS domain to the CS domain; the sending module is further configured to send, to an MSC, a second switch request for switching the UE from the PS domain to the CS domain, where the second switch request carries second CSFB indication information, and the second CSFB indication information indicates that the second switch request is sent to perform the CSFB; the receiving module is further configured to receive a switch response message sent by the MSC; and the sending module is further configured to send a first switch command to the eNodeB, so that after the eNodeB receives the first switch command, the eNodeB sends a second switch command to the UE, where the second switch command instructs the UE to switch from the PS domain to the CS domain, so that after the UE switches to the CS domain according to the second switch command, the UE releases or holds a default CS call that is generated by the UE according to the second switch command.

In a first possible implementation manner, the second CSFB indication information is a preconfigured STN-SR.

With reference to the sixth aspect or the first possible implementation manner of the sixth aspect, in a second possible implementation manner, the first switch request carries first CSFB indication information, and the first CSFB indication information indicates that the first switch request message is sent to perform the CSFB.

With reference to the second possible implementation manner of the sixth aspect, in a third possible implementation manner, the first CSFB indication information is SRVCC switch indication information.

With reference to the sixth aspect or any one possible implementation manner of the first to third possible implementation manners of the sixth aspect, in a fourth possible implementation manner, the receiving module is further configured to: before receiving the request message that is sent by the user equipment UE and used to request to perform the circuit switched fallback CSFB, receive a voice coding/decoding capability and an SRVCC capability that are sent by the UE and supported by the UE.

Based on the foregoing technical solutions, in the embodiments of the present application, a UE is triggered to switch from a PS domain to a CS domain when the UE requests CSFB; a default CS call generated during switch is released or held after the UE accesses the CS domain; and then, a CS call is initiated or a CS call is received, which can implement circuit switched fallback in a manner of switching by the UE from the PS domain to the CS domain. In a process of implementing circuit switched fallback in a manner of switching from the PS domain to the CS domain, the UE switches by receiving a switch command, and it is avoided that system information is acquired by reading a broadcast message in the CS domain; therefore, a call delay is reduced.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 6 is another schematic flowchart of a circuit switched fallback method according to another embodiment of the present application;

FIG. 7 is still another schematic flowchart of a circuit switched fallback method according to another embodiment of the present application;

DESCRIPTION OF EMBODIMENTS

Figure 1:
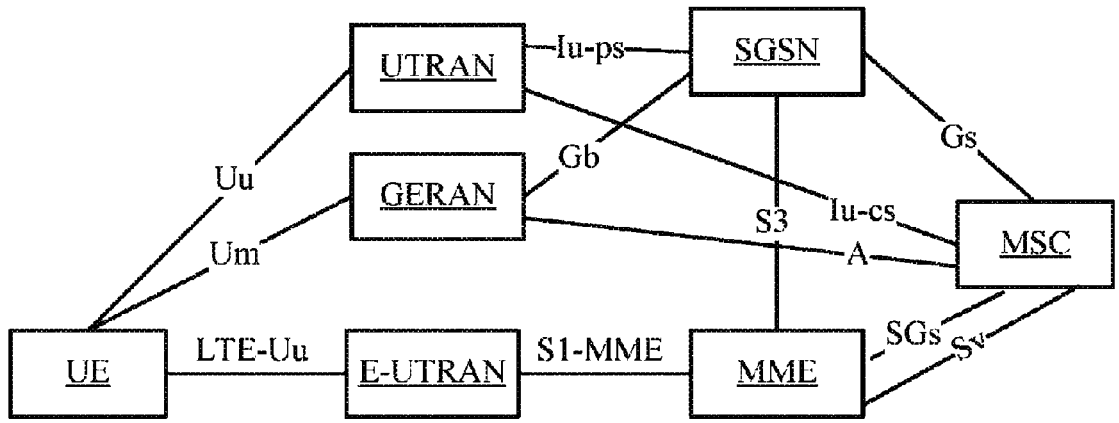
FIG. 1 is a schematic diagram of an architecture of a system according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

In a single radio voice call continuity (SRVCC) process, a call is a VoIP call when a UE is on an LTE side, and a call is a CS call when the UE is on a 2G/3G side. When the VoIP call on the LTE side needs to fall back to 2G/3G side, an eNB sends, to an MME, a request message for switching from PS domain to CS domain, the MME initiates SRVCC switch, an MSC initiates a session transfer process and the MSC sends, to the MME, a response message for switching from the PS to the CS, the MME sends a switch command to the eNB, and the eNB sends the switch command to the UE.

After the UE receives the switch command and determines to switch from the PS to the CS, the UE needs to set up a default call, where the call is identified by a TI (transaction ID), for example, the set up default call TI=0. The default call represents the VoIP call set up on the LTE side; and if the UE subsequently performs an operation on the call, the UE directly performs an operation, for example, an operation such as release or hang-up, on the call whose TI=0.

However, when falling back to the circuit switched domain in a manner of switching from the PS to the CS, to perform MTC or MOC processing, although there is no VoIP call on the LTE side, the UE still sets up a default call in an existing implementation solution, and the MSC may also correspondingly set up a default call. In this way, the default call exists on the UE and the MSC. In a case in which the UE initiates a call, the MSC does not initiate a call to a peer UE; as a result, from a global perspective, the call is not connected. Therefore, the UE needs to initiate a new call after access is completed, to implement a voice call with a peer end. However, a TI different from that of an existing call is allocated when a new call is set up, and the MSC sees that the UE has two TIs, which results in a wrong connection of the MSC. In a case in which the UE is called, the MSC also sets up a default call, where the call also exists on only the UE and the MSC, and information of a called party from a peer end also exists on the MSC; as a result, the MSC also sees that the UE has two TIs, which results in a wrong connection of the MSC. In addition, an existing processing procedure of a mobility management entity does not support implementation of CSFB in a manner of switching from the PS to the CS.

In the embodiments of the present application, circuit switched fallback is implemented in a manner of switching by a UE from a PS domain to a CS domain. The UE releases or holds, after falling back to the circuit switched domain, a default CS call generated in a switch process, and initiates a CS call or receives a CS domain call, so that a wrong connection is avoided and a call is set up. In this manner of setting up a call, the UE switches to the CS domain according to a received switch command without a need of acquiring a system message in a broadcast manner; therefore, a call setup delay is reduced.

It should be understood that in the embodiments of the present application, if there is no particular description, terms "first" and "second" are merely intended to distinguish different information or content, but are not intended to limit the embodiments of the present application.

FIG. 1 is a schematic diagram of an architecture of a system according to an embodiment of the present application. As shown in FIG. 1, an Sv interface is added between an MME and an MSC in an existing architecture.

It should be understood that in this embodiment of the present application, each entity may also be described as a device; and each entity may be a separate device or may be a device disposed in another device. For example, the MME and the MSC may also be described as an MME device and an MSC device.

Figure 2:
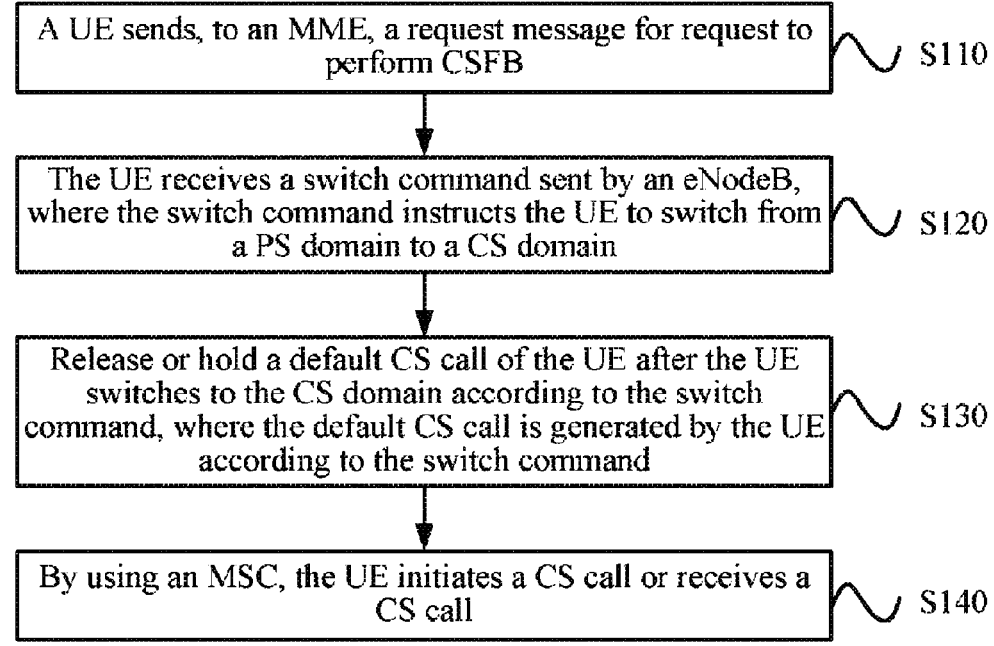
FIG. 2 is a schematic flowchart of a circuit switched fallback method according to an embodiment of the present application.

FIG. 2 is a schematic flowchart of a circuit switched fallback method 100 according to an embodiment of the present application. As shown in FIG. 2, the method 100 includes:

S110: A UE sends, to an MME, a request message for requesting to perform CSFB.

S120: The UE receives a switch command sent by an eNodeB, where the switch command instructs the UE to switch from a PS domain to a CS domain.

S130: Release or hold a default CS call of the UE after the UE switches to the CS domain according to the switch command, where the default CS call is generated by the UE according to the switch command.

S140: By using an MSC, the UE initiates a CS call or receives a CS call.

In this embodiment of the present application, when the UE serves as a calling party, that is, initiates a CS call, or serves as a called party, that is, responds to a CS call, the UE sends, to the MME, the request message for requesting to perform the CSFB such as an extended service request; a network triggers the UE to switch from the PS to the CS; after the UE receives a switch command from a network side, the UE accesses the CS domain and generates the default CS call such as a call whose TI=0; and then the UE releases or holds the generated default CS call, that is, the default CS call is not used, and by using the MSC, initiates a CS call or receives a CS call.

Therefore, according to the circuit switched fallback method in this embodiment of the present application, after a UE implements circuit switched fallback in a manner of switching from a PS domain to a CS domain, the UE releases or holds a default call generated during switch, and initiates a CS call or receives a CS call, thereby implementing a call with a peer end.

It should be understood that the technical solution in this embodiment of the present application is applicable to various systems that support switch from PS to CS, for example, a system that supports SRVCC.

In S110, the UE sends, to the MME, the request message for requesting to perform the circuit switched fallback CSFB.

Specifically, when the UE needs to initiate a CS call or the UE receives a CS paging message, the UE needs to fall back to the CS domain; therefore, the UE sends an extended service request to the MME to request the CSFB.

After the MME receives the extended service request sent by the UE, the MME may determine whether a network supports switch from the PS to the CS; and when the MME determines that the network supports switch from the PS to the CS, the MME sends an S1 interface message such as an S1-AP message to the eNodeB. Alternatively, the MME may directly send an S1 interface message to the eNodeB in a case in which whether a network supports switch from the PS to the CS does not need to be determined, for example, the network supports switch from the PS to the CS by default. The MME sends, after receiving the extended service request, the S1 interface message to instruct to switch the UE from a PS domain, that is, a PS domain of an LTE network, to a CS domain of a 2G or 3G network; therefore, the switch is switch triggered by the CSFB. The S1 interface message instructs the eNodeB to switch the UE from the PS domain to the CS domain. For example, the S1 interface message carries indication information, where the indication information is used to instruct the eNodeB to switch the UE from the PS domain to the CS domain. For the purpose of distinguishing from existing CSFB indication information, the indication information may be referred to as enhanced CSFB indication information. The S1-AP message may be an initial context setup request message (INITIAL CONTEXT SETUP REQUEST) or a UE context modification request message (UE CONTEXT MODIFICATION REQUEST). The enhanced CSFB indication information may be a piece of separate indication information added into the S1-AP message, or may be a piece of indication information added into an existing CSFB indication.

After receiving the S1-AP message, the eNodeB performs switch to a CS domain of a Universal Mobile Telecommunications System (UMTS) or a Global System for Mobile Communications (GSM) according to the enhanced CSFB indication information. Further, if the network supports PS switch of a universal terrestrial radio access network (UTRAN) or a GSM/Enhanced Data rates for GSM Evolution (EDGE) radio access network (GERAN), the eNodeB may also simultaneously trigger PS switch of the UTRAN or the GERAN. Then, the eNodeB sends, to the MME, a first switch request for switching the UE from the PS domain to the CS domain. The first switch request may carry first CSFB indication information, and the first CSFB indication information indicates that the first switch request message is sent to perform the CSFB, that is, indicates that the first switch request is triggered by the CSFB. Optionally, the first CSFB indication information may be a CSFB indication and an SRVCC switch indication, and indicates that the switch of the UE from the PS to the CS is triggered h the CSFB. Alternatively, the first CSFB indication information is SRVCC switch indication information, and the MME determines, according to the SRVCC switch indication information and a saved session transfer number-single radio (Session Transfer Number-Single Radio, STN-SR), that the first switch request is triggered by the CSFB, or the MME determines, according to the SRVCC switch indication information and a saved CSFB state, that the first switch request is triggered by the CSFB.

After receiving the first switch request sent by the eNodeB, the MME may determine, according to the first CSFB indication information, that the first switch request message is sent to perform the CSFB. Alternatively, when previously receiving an extended service request of the UE, the MME adds a CSFB state to record that the CSFB state occurs, and determines, according to the recorded CSFB state when receiving the first switch request, that the switch of the UE from the PS to the CS is triggered by the CSFB, that is, the first switch request is sent to perform the CSFB.

Then, the MME sends, to the MSC, a second switch request for switching the UE from the PS domain to the CS domain, where the second switch request carries second CSFB indication information, and the second CSFB indication information indicates that the second switch request is sent to perform the CSFB, that is, the second switch request is triggered by the CSFB. Optionally, the second CSFB indication information may be a separate indication or may be a preconfigured STN-SR. That is, the MME uses the switch request to carry a special STN-SR, and the MSC determines, according to the special STN-SR, that a switch process is performed for the CSFB, where the special number may be preconfigured on the MME and the MSC.

Optionally, before S110, the method 100 further includes: sending, by the UE, a supported voice coding/decoding capability and a supported SRVCC capability to the MME.

For example, the UE reports the supported voice coding/decoding capability and the supported SRVCC capability (for example, a classmark (classmark) 2 or Classmark 3) in a network attachment procedure or a tracking area update (TAU) procedure.

Optionally, the MME sends, to the MSC, the supported voice coding/decoding reported by the UE.

After receiving the switch request (that is, the second switch request) sent by the MME, the MSC makes switch preparation for switch of the UE from the PS domain to the CS domain, and reserves a resource to generate a default CS call such as a call whose TI=0. Alternatively, the MSC does not generate, according to the CSFB indication information (that is, the second CSFB indication information) carried in the switch request, a call whose TI=0. The MSC does not send an initial address message (IAM) or INVITE message. Optionally, the MSC may need to trigger inter-MSC switch. After the switch preparation is completed, the MSC sends a switch response message to the MME.

Optionally, the MME sends a switch request to a serving general packet radio service (GPRS) support node (SGSN), to trigger switch from PS domain to PS domain.

After receiving the switch response message sent by the MSC, the MME sends a first switch command to the eNodeB, and the eNodeB sends a second switch command to the UE, where the second switch command instructs the UE to switch from the PS domain to the CS domain. Optionally, if switch from the PS domain to PS domain is also triggered, the MME coordinates a response message for switching from the PS to the CS and a response message for switching from the PS to the PS, and the MME combines the two messages and combines a PS transparent container and a CS transparent container, where the switch command sent by the MME to the eNodeB includes a combined transparent container. Optionally, the eNodeB adds a CSFB indication into the switch command sent to the UE. When access of the UE fails, the UE selects an available 2G or 3G network if the UE receives the CSFB indication.

In S120, the UE receives the swath command (that is, the second switch command) sent by the eNodeB, where the switch command instructs the UE to switch from the PS domain to the CS domain.

In S130, the UE releases or holds the default CS call of the UE after the UE switches to the CS domain according to the switch command.

The UE accesses a GERAN/UTRAN network according to the switch command, and automatically generates a default CS call such as a call whose TI=0. The UE sends a switch completion message to a base station subsystem (BSS) or a radio network subsystem (RNS) after completing the switch, and the BSS or the RNS sends the switch completion message to the MSC.

A new call can be proceeded only after the default CS call generated in the switch process is released or held.

Figure 3:
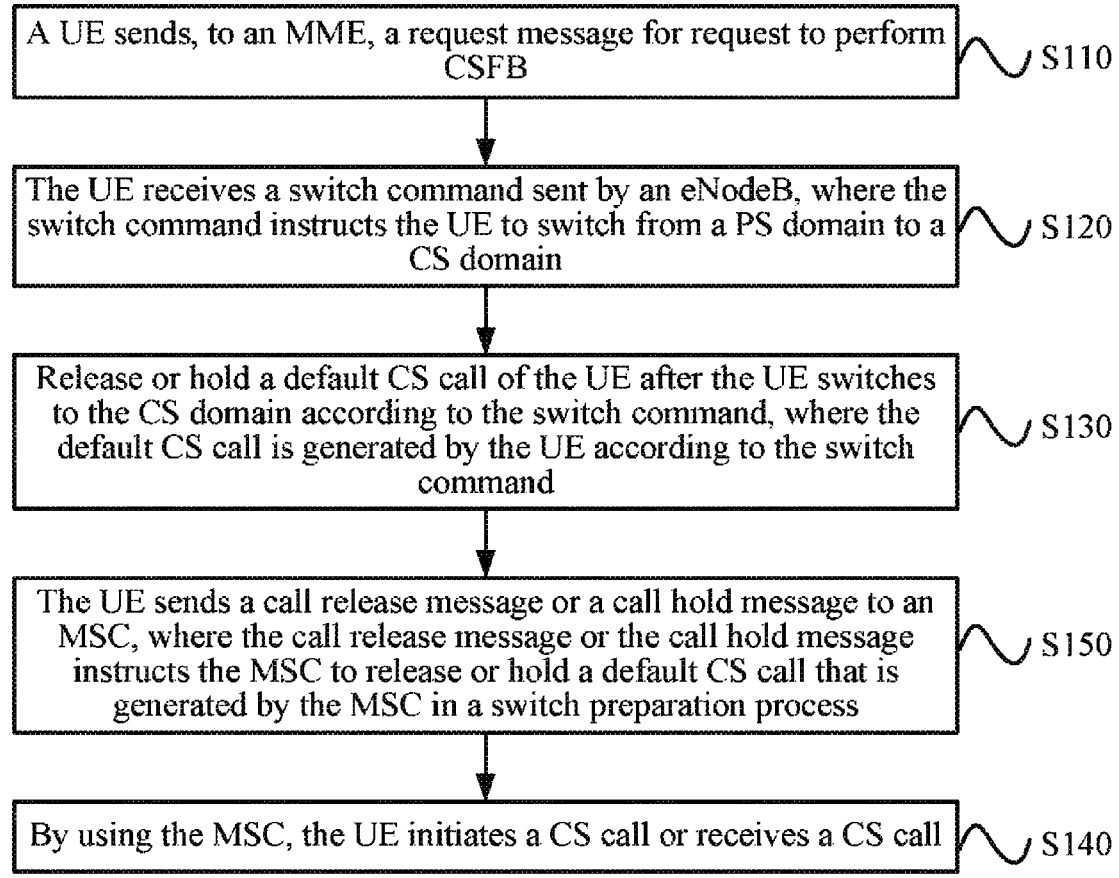
FIG. 3 is another schematic flowchart of a circuit switched fallback method according to an embodiment of the present application.

Optionally, as shown in FIG. 3, the method 100 further includes:

S150: The UE sends a call release message or a call hold message to the MSC, where the call release message or the call hold message instructs the MSC to release or hold a default CS call that is generated by the MSC in a switch preparation process.

Specifically, in this embodiment of the present application, the UE releases or holds the automatically generated call whose TI=0, and sends a call release message (disconnect) or a call hold message (hold) to the MSC, where a TI included in the call release message or the call hold message is 0; and the MSC releases or holds, according to CSFB indication information and the call release message or the call hold message, a call whose TI=0 and that is generated by the MSC in the switch preparation process. The MSC does not send a message to a calling peer office, and does not perform iu release (release) either. For the call hold message, the MSC replies to the UE with a hold acknowledgment, and for the call release message, the MSC sends no response message to the UE.

Figure 4:
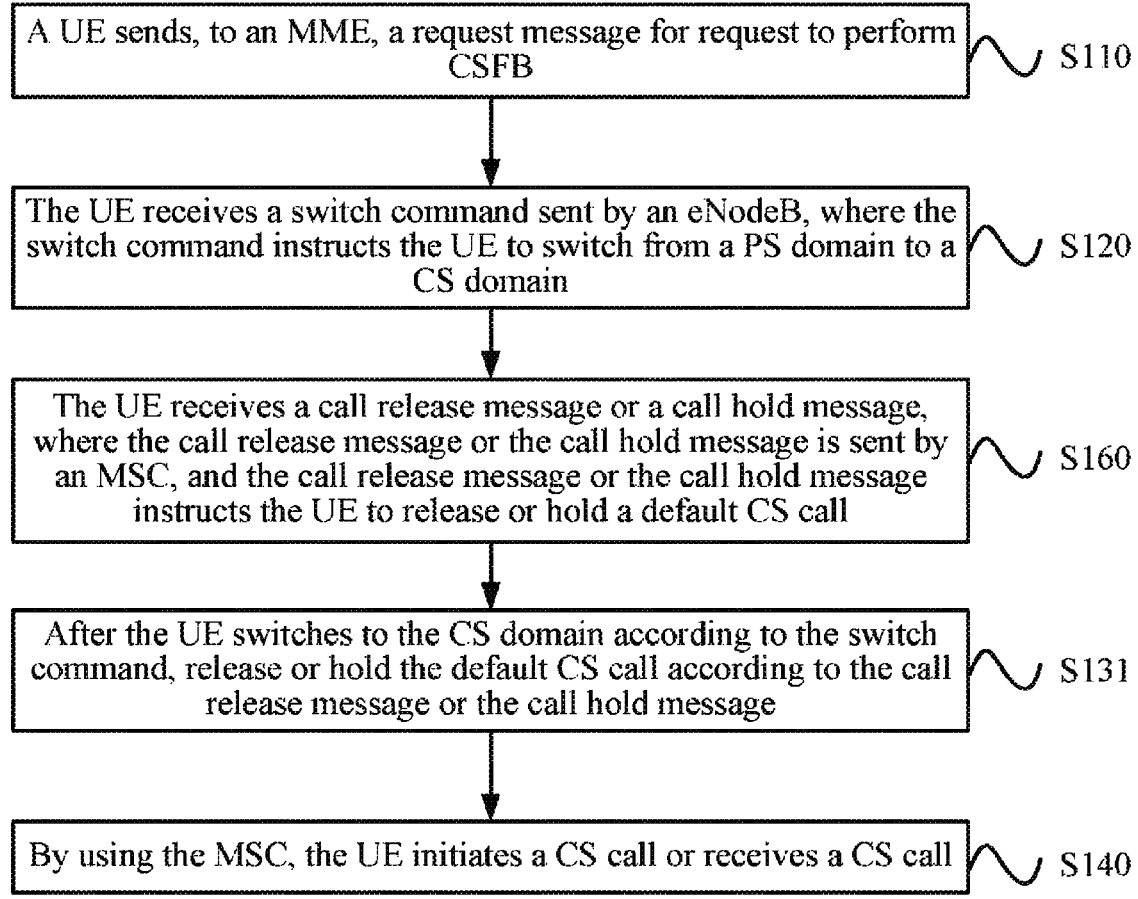
FIG. 4 is still another schematic flowchart of a circuit switched fallback method according to an embodiment of the present application.

Optionally, as shown in FIG. 4, before the default CS call of the UE is released or held, the method 100 further includes:

S160: The UE receives a call release message or a call hold message, where the call release message or the call hold message is sent by the MSC, and the call release message or the call hold message instructs the UE to release or hold the default CS call.

Releasing or holding the default CS call of the UE includes:

S131: The UE releases or holds the default CS call according to the call release message or the call hold message.

In this embodiment of the present application, the MSC sends the call release message or the call hold message to the UE, that is, the MSC releases or holds, according to CSFB indication information, a call whose TI=0 and that is generated by the MSC in a switch preparation process. The MSC sends no iu release, and the MSC sends the call release message or the call hold message to the UE, where a TI included in the call release message or the call hold message is 0; and the UE releases or holds, according to the call release message or the call hold message, a call whose TI=0 and that is generated by the UE.

Optionally, the UE may not automatically generate, according to the CSFB indication in the switch command, a call whose TI=0; and correspondingly, the MSC does not generate, according to the CSFB indication information carried in the switch request sent by the MME, a call whose TI=0.

In S140, by using the MSC, the UE initiates a CS call or receives a CS call.

After releasing or holding the default call, by using the MSC, the UE initiates a CS call or receives a CS call, to implement a call with a peer end.

Specifically, when the UE initiates a call, after releasing or holding the call whose TI=0, the UE triggers a connection management service request (CM Service Request) process, the MSC triggers an authentication process, and the UE sends a CS call setup message to the MSC, that is, Setup, where the CS call setup message carries a called number. The MSC receives the CS call setup message, and sends an outgoing call according to the CS call setup message. If the MSC previously generates a CS call whose TI=0, the CS call setup message carries TI=Y, where Y is not 0, and the MSC updates the TI to Y.

When the UE is called, after releasing or holding the call whose TI=0, the MSC sends a CS call setup message to the UE, that is, Setup, where the CS call setup message carries a calling number, to complete a current call.

In this way, according to the circuit switched fallback method in this embodiment of the present application, CSFB triggers a UE to switch from a PS domain to a CS domain; a default CS call generated during switch is released or held after the UE accesses the CS domain; and then, a CS call is initiated or a CS call is received, so that a wrong connection is avoided and a call is set up. In this manner of setting up a call, the UE switches to the CS domain according to a received switch command without a need of acquiring a system message in a broadcast manner; therefore, a call setup delay is reduced.

The circuit switched fallback method in the embodiments of the present application is described in detail in the foregoing from a perspective of a UE, and the circuit switched fallback method in the embodiments of the present application is described in the following from a perspective of an MSC.

Figure 5:
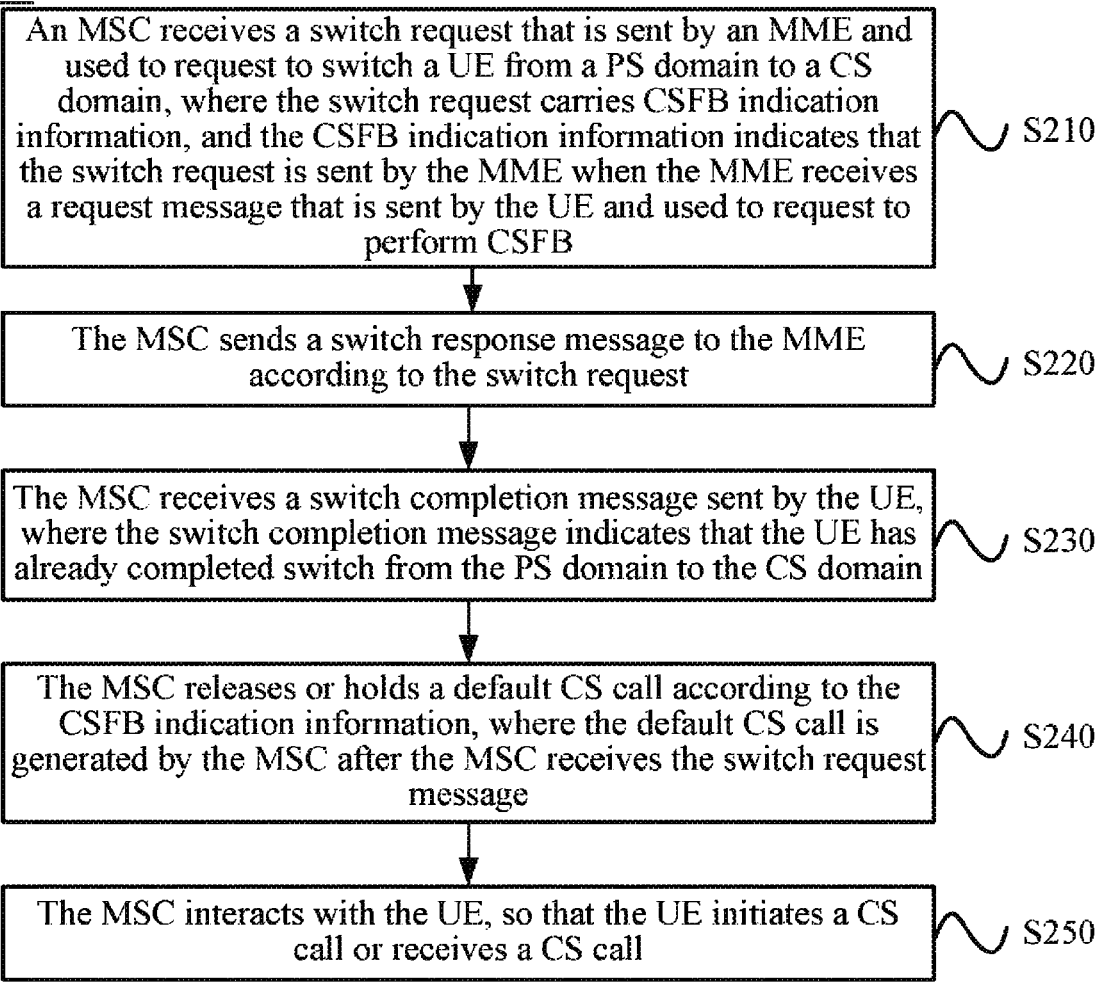
FIG. 5 is a schematic flowchart of a circuit switched fallback method according to another embodiment of the present application.

FIG. 5 is a schematic flowchart of a circuit switched fallback method 200 according to another embodiment of the present application. As shown in FIG. 5, the method 200 includes:

S210: An MSC receives a switch request that is sent by an MME and used to request to switch a UE from a PS domain to a CS domain, where the switch request carries CSFB indication information, and the CSFB indication information indicates that the switch request is sent by the MME when the MME receives a request message that is sent by the UE and used to request to perform CSFB.

S220: The MSC sends a switch response message to the MME according to the switch request.

S230: The MSC receives a switch completion message sent by the UE, where the switch completion message indicates that the UE has already completed switch from the PS domain to the CS domain.

S240: The MSC releases or holds a default CS call according to the CSFB indication information, where the default CS call is generated by the MSC after the MSC receives the switch request message.

S250: The MSC interacts with the UE, so that the UE initiates a CS call or receives a CS call.

In this embodiment of the present application, the MSC receives the switch request that is sent by the MME and used to switch the UE from the PS domain to the CS domain, and determines, according to the CSFB indication information carried in the switch request, that the switch request is sent by the MME when the MME receives the request message that is sent by the UE and used to request to perform the CSFB, that is, the switch request is triggered by the CSFB. Then, the MSC makes, according to the switch request, switch preparation for switch of the UE from the PS to the CS, and generates a default call such as a call whose TI=0; and after the switch preparation is completed, the MSC sends the switch response message to the MIME. The MME sends a switch command to an eNodeB, the eNodeB sends the switch command to the UE, and the UE accesses the CS domain. After the UE accesses the CS domain, the MSC releases or holds, according to the CSFB indication information, the default CS call generated by the MSC, that is, the default CS call is not used; and then interacts with the UE, so that the UE initiates a CS call or receives a CS call, that is, sets up a new CS call for the UE to implement a call between the UE and a peer end.

Therefore, according to the circuit switched fallback method in this embodiment of the present application, after a UE accesses a CS domain, a default CS call generated during switch is released or held, and then a new CS call is set up, which can implement circuit switched fallback in a manner of switching by the UE from a PS domain to the CS domain, and reduce a delay, so that user experience can be improved.

Optionally, as shown in FIG. 6, before the default CS call is released or held, the method 200 further includes:

S260: The MSC receives a call release message or a call hold message, where the call release message or the call hold message is sent by the UE, and the call release message or the call hold message instructs the MSC to release or hold the default CS call.

Releasing or holding the default CS call includes:

S241: The MSC releases or holds the default CS call according to the CSFB indication information and the call release message or the call hold message.

In this embodiment of the present application, the UE sends the call release message or the call hold message to the MSC, that is, the UE releases or holds an automatically generated call whose TI=0, and sends the call release message or the call hold message to the MSC, where a TI included in the call release message or the call hold message is 0; and the MSC releases or holds, according to the CSFB indication information and the call release message or the call hold message, a call whose TI=0 and that is generated by the MSC in a switch preparation process. The MSC does not send a message to a calling peer office, and does not perform iu release either. For the call hold message, the MSC replies to the UE with a hold acknowledgment (hold acknowledge), and for the call release message, the MSC sends no response message to the UE.

Optionally, as shown in FIG. 7, the method 200 further includes:

S270: The MSC sends a call release message or a call hold message to the UE, where the call release message or the call hold message instructs the UE to release or hold a default CS call generated by the UE.

In this embodiment of the present application, the MSC sends the call release message or the call hold message to the UE, that is, the MSC releases or holds, according to the CSFB indication information, a call whose TI=0 and that is generated by the MSC in a switch preparation process. The MSC sends no iu release, and the MSC sends the call release message or the call hold message to the UE, where a TI included in the call release message or the call hold message is 0; and the UE releases or holds, according to the call release message or the call hold message, a call whose TI:=0 and that is generated by the UE.

Optionally, the MSC may not automatically generate, according to the CSFB indication information carried in the switch request sent by the MME, a call whose TI=0 in a switch preparation process; and correspondingly, the UE may not generate, according to the CSFB indication information in the switch command, a call whose TI=0.

In this embodiment of the present application, optionally, the CSFB indication information is a preconfigured STN-SR. That is, the MME uses the switch request to carry a special STN-SR value, and the MSC determines, according to the special STN-SR value, that a switch process is performed for the CSFB, where the special value may be preconfigured on the MME and the MSC.

It should be understood that in this embodiment of the present application, interaction among the UE, the MSC, the MME, and the eNodeB, and related properties, functions, and the like described on a UE side correspond to those described on an MSC side; and for brevity, a detailed description is not provided herein again.

Therefore, according to the circuit switched fallback method in this embodiment of the present application, after a UE accesses a CS domain, a default CS call generated during switch is released or held, and then a new CS call is set up, which can implement circuit switched fallback in a manner of switching by the UE from a PS domain to the CS domain.

The circuit switched fallback method in the embodiments of the present application is described in detail in the foregoing from perspectives of a UE and an MSC, and the circuit switched fallback method in the embodiments of the present application is described in the following from a perspective of an MME.

Figure 8:
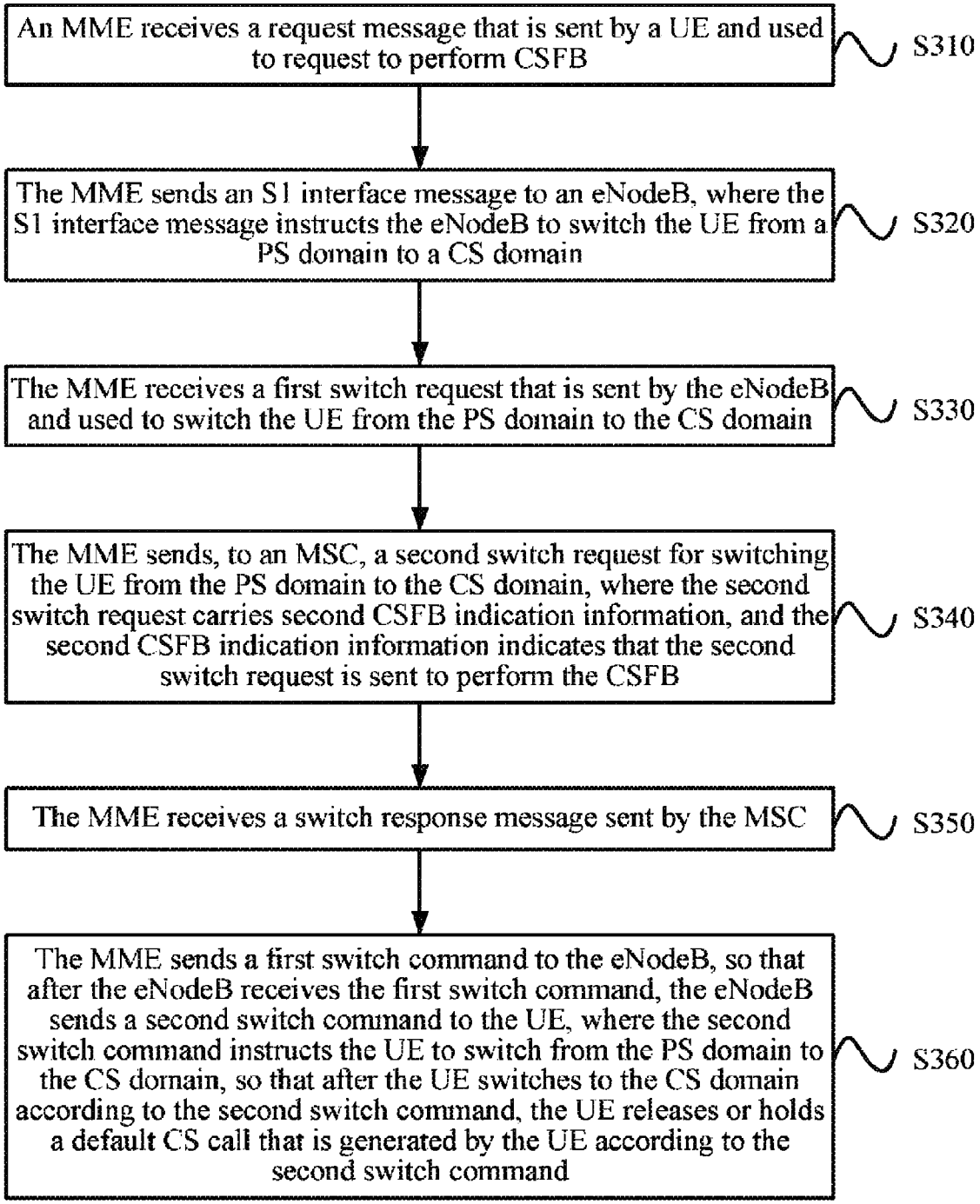
FIG. 8 is a schematic flowchart of a circuit switched fallback method according to still another embodiment of the present application.

FIG. 8 is a schematic flowchart of a circuit switched fallback method 300 according to still another embodiment of the present application. As shown in FIG. 8, the method 300 includes:

S310: An MME receives a request message that is sent by a UE and used to request to perform CSFB.

S320: The MME sends an S1 interface message to an eNodeB, where the S1 interface message instructs the eNodeB to switch the UE from a PS domain to a CS domain.

S330: The MME receives a first switch request that is sent by the eNodeB and used to switch the UE from the PS domain to the CS domain.

S340: The MME sends, to an MSC, a second switch request for switching the UE from the PS domain to the CS domain, where the second switch request carries second CSFB indication information, and the second CSFB indication information indicates that the second switch request is sent to perform the CSFB.

S350: The MME receives a switch response message sent by the MSC.

S360: The MME sends a first switch command to the eNodeB, so that after the eNodeB receives the first switch command, the eNodeB sends a second switch command to the UE, where the second switch command instructs the UE to switch from the PS domain to the CS domain, so that after the UE switches to the CS domain according to the second switch command, the UE releases or holds a default CS call that is generated by the UE according to the second switch command.

In this embodiment of the present application, after receiving the request message that is sent by the UE and used to request to perform the CSFB, for example, an extended service request for requesting the CSFB, the MME triggers the UR to switch from the PS to the CS. After completing switch preparation, the MSC sends, to the UE, the switch command for instructing the UE to switch from the PS to the CS. The UE accesses the CS domain according to the switch command. After the UE accesses the CS domain, the UE and the MSC release or hold a default CS call automatically generated during switch, and set up a new CS call.

In this embodiment of the present application, circuit switched fallback is implemented in a manner of switching by a UE from a PS domain to a CS domain. The UE releases or holds, after falling back to the circuit switched domain, a default CS call generated in a switch process, and initiates a CS call or receives a CS domain call, so that a wrong connection is avoided and a call is set up. In this manner of setting up a call, the UE switches to the CS domain according to a received switch command without a need of acquiring a system message in a broadcast manner; therefore, a call setup delay is reduced.

In this embodiment of the present application, optionally, the second CSFB indication information is a preconfigured STN-SR. That is, the MME uses the switch request to carry a special STN-SR value, and the MSC determines, according to the special STN-SR value, that a switch process is performed for the CSFB, where the special value may be preconfigured on the MME and the MSC.

In this embodiment of the present application, optionally, the first switch request carries first CSFB indication information, and the first CSFB indication information indicates that the first switch request message is sent to perform the CSFB.

Optionally, the first CSFB indication information is SRVCC switch indication information.

In this embodiment of the present application, optionally, before S310, the method 300 further includes:

receiving, by the MME, a supported voice coding/decoding capability and a supported SRVCC capability that are sent by the UE.

For example, the UE reports the supported voice coding/decoding capability and the supported SRVCC capability (for example, a classmark 2 or Classmark 3) in a network attachment procedure or a TAU procedure.

Optionally, the MME sends, to the MSC, the supported voice coding/decoding reported by the UE.

It should be understood that in this embodiment of the present application, interaction among the UE, the MSC, the MME, and the eNodeB, and related properties, functions, and the like described on a UE side correspond to those described on an MME side; and for brevity, a detailed description is not provided herein again.

The circuit switched fallback method in the embodiments of the present application is described in detail in the foregoing from perspectives of a UE, an MSC, and an MME, and the embodiments of the present application are described in detail in the following with reference to specific examples. It should be noted that these examples are merely for the purpose of helping a person skilled in the art better understand the embodiments of the present application, but are not intended to limit the scope of the embodiments of the present application.

Figure 9:
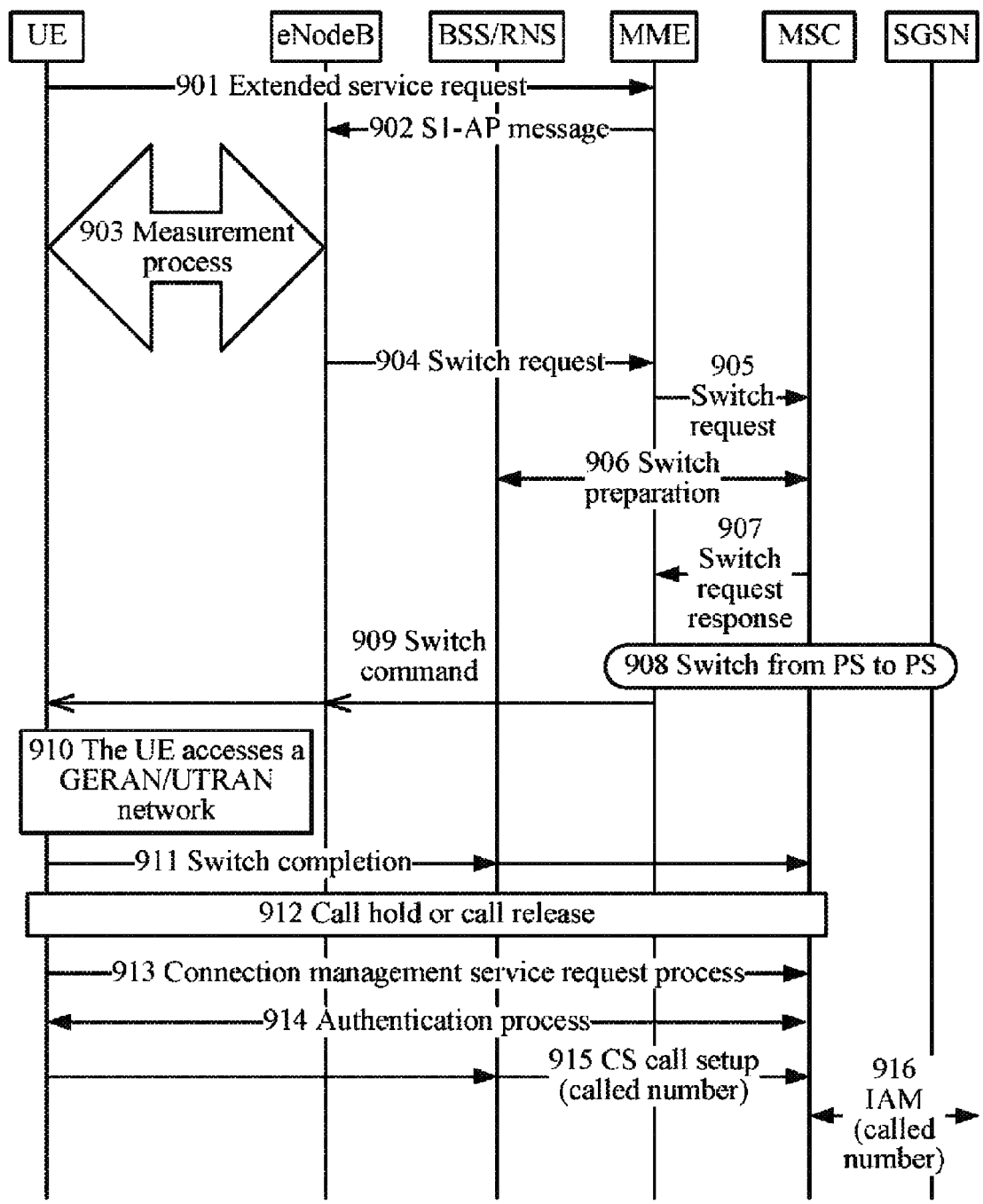
FIG. 9 is a schematic interaction diagram of a circuit switched fallback method according to an embodiment of the present application.

FIG. 9 is a flowchart in a case in which a UE initiates a call according to an embodiment of the present application.

901: A UE sends an extended service request to an MME. When determining to initiate a CS call, the UE sends the extended service request to the MME, to request CSFB.

902: The MME sends an S1-AP message to an eNodeB. The S1-AP message carries a CSFB indication to instruct the eNodeB to perform switch, which is triggered by the CSFB, of the UE from a PS domain to a CS domain.

903: Perform a measurement process. Optionally, the eNodeB commands the UE to measure radio signal quality of a target network, and determines to perform switch when signal quality meets a switch condition.

904: The eNodeB sends, to the MME, a request for switching from the PS to the CS. The switch request carries CSFB indication information that is used to indicate that the switch request is triggered by the CSFB, that is, a switch process is performed for the CSFB.

905: The MME sends, to an MSC, a request for switching from the PS to the CS. The switch request also carries CSFB indication information that is used to indicate that the switch request is triggered by the CSFB, that is, a switch process is performed for the CSFB.

906: The MSC makes preparation for switch to the CS domain, and reserves a resource. Optionally, the MSC may need to trigger inter-MSC switch. In a switch preparation process, the MSC automatically generates a call whose TI=0.

907: The MSC sends a switch request response to the MME.

908: Optionally, the MME sends a switch request to an SGSN to trigger switch from the PS domain to PS domain. Step 908 and step 904 may be simultaneously performed.

909: The MME sends a switch command to the eNodeB, and the eNodeB sends the switch command to the UE. Optionally, if switch from the PS to PS is also triggered, the MME coordinates a response message for switching from the PS to the CS and a response message for switching from the PS to the PS, and the MME combines the two messages and combines a PS transparent container and a CS transparent container, where the switch command sent by the MME to the eNodeB includes a combined transparent container. Optionally, the eNodeB adds a CSFB indication into the switch command sent to the UE. When access of the UE fails, the UE selects an available 2G or 3G network if the UE receives the CSFB indication.

910: The LIE accesses a GERAN/UTRAN network. The UE accesses the CS domain according to the switch command, and automatically generates a default call, that is, a call whose TI=0.

911: The UE sends a switch completion message to a BSS/an RNS, and the BSS/the RNS sends a switch completion message to the MSC.

912: The UE and the MSC release or hold an automatically generated call whose TI=0. It may be that the UE sends a call release message or a call hold message to the MSC or the MSC sends a call release message or a call hold message to the UE.

913: The UE triggers a connection management service request process.

914: The MSC triggers an authentication process.

915: The UE sends a CS call setup message to the MSC, where the CS call setup message carries a called number.

916: The MSC receives the CS call setup message, and sends an outgoing call.

Figure 10:
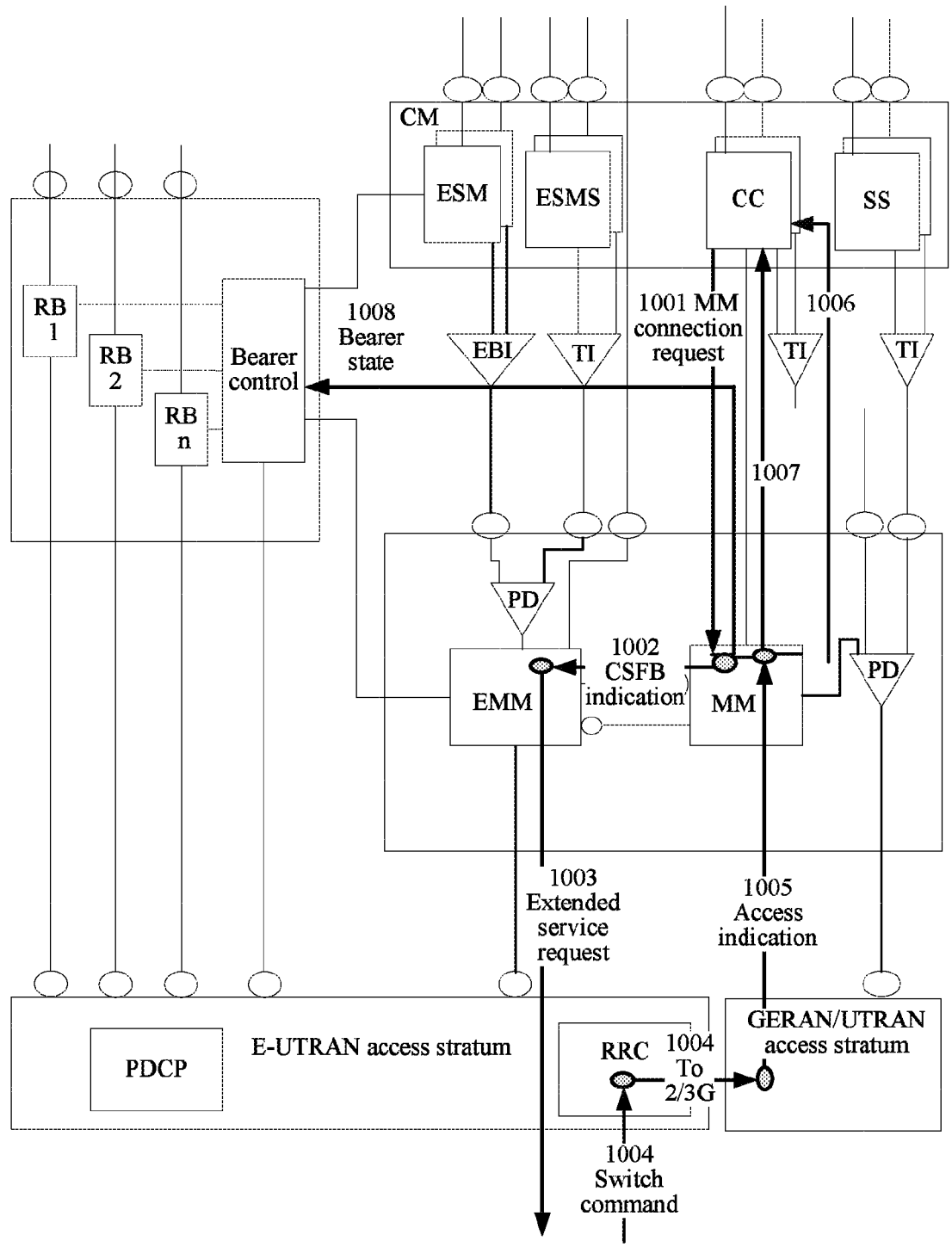
FIG. 10 is a schematic diagram of a protocol stack in a case in which a UE initiates a call according to an embodiment of the present application.

FIG. 10 is a schematic diagram of a protocol stack in a case in which a UE initiates a call according to an embodiment of the present application. As shown in FIG. 10, during calling:

1001: A call control layer (Call Control, CC) requests a mobility management layer (MM) to set up an MM connection.

1002: The MM layer instructs an E-UTRAN mobility management layer (EMM) to perform a CSFB process.

1003: The EMM layer sends an extended service request to a network, to trigger the network to fall back to a 2G or 3G network.

1004: A UE receives a switch command that includes a radio resource of a 2/3G CS domain, to access the 2G or 3G network. Optionally, if the UE receives a CSFB indication, when access of the UE fails, the UE selects an available 2G or 3G network. Specifically, an E-UTRAN access stratum forwards information about the radio resource of the 2G or 3G CS domain in the switch command to a GERAN/UTRAN access stratum.

1005: The GERAN/UTRAN access stratum instructs the UE at the MM layer to access the 2G or 3G network.

1006: Because the UE supports SRVCC, the access stratum notifies that switch is SRVCC switch, and autonomously sets up an MM connection whose TI=0.

1007: Because a call whose TI=0 exists, perform multi-call processing: call hold, call waiting, or call release. The MM layer triggers a connection management service request process, and instructs the CC layer to set up an MM connection; and the CC layer sends a CS call setup message and continues a CS call process.

1008: The GERAN/UTRAN access stratum notifies a bearer control layer of a related bearer setup status by using the MM layer.

Figure 11:
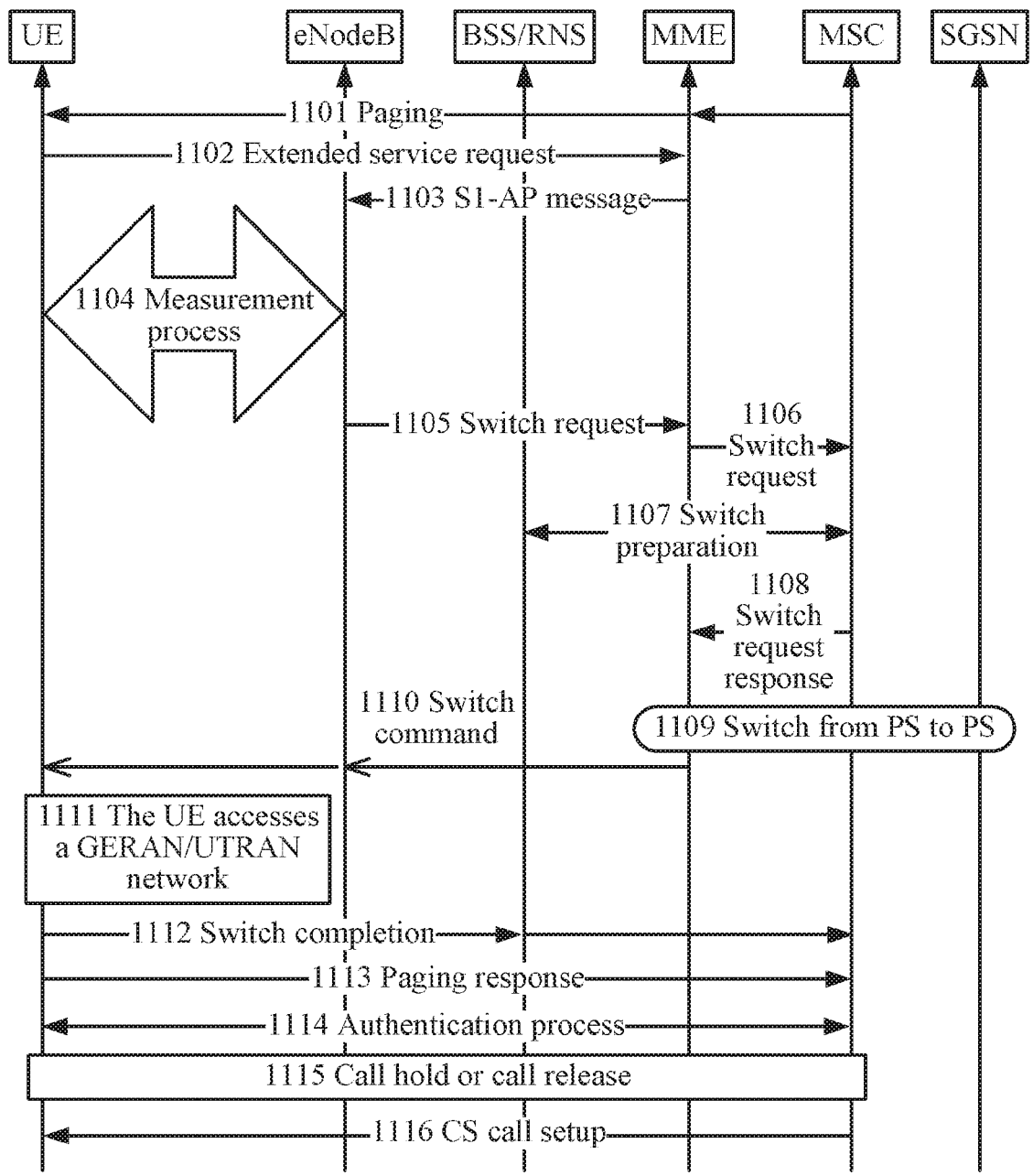
FIG. 11 is another schematic interaction diagram of a circuit switched fallback method according to an embodiment of the present application.

FIG. 11 is a flowchart in a case in which a UE is called according to an embodiment of the present application.

1101: After receiving an incoming call, an MSC sends a CS paging request to an MME, and the MME sends the CS paging message to a UE, where the CS paging message indicates a circuit switched CS domain.

1102: The UE sends an extended service request to the MME. After receiving the CS paging message, the UE sends the extended service request to the MME, to request CSFB.

1103: The MME sends an S1-AP message to an eNodeB. The S1-AP message carries a CSFB indication to instruct the eNodeB to perform switch, which is triggered by the CSFB, of the UE from a PS domain to the CS domain.

1104: Perform a measurement process, Optionally, the eNodeB commands the UE to measure radio signal quality of a target network, and determines to perform switch when signal quality meets a switch condition.

1105: The eNodeB sends, to the MME, a request for switching from the PS to the CS. The switch request carries CSFB indication information that is used to indicate that the switch request is triggered by the CSFB.

1106: The MME sends, to the MSC, a request for switching from the PS to the CS. The switch request also carries CSFB indication information that is used to indicate that the switch request is triggered by the CSFB.

1107: The MSC makes preparation for switch to the CS domain, and reserves a resource. Optionally, the MSC may need to trigger inter-MSC switch. In a switch preparation process, the MSC automatically generates a call whose TI=0.

1108: The MSC sends a switch request response to the MME.

1109: Optionally, the MME sends a switch request to an SGSN to trigger switch from the PS to PS. Step 1109 and step 1105 may be simultaneously performed.

1110: The MME sends a switch command to the eNodeB, and the eNodeB sends the switch command to the UE. Optionally, if switch from the PS to PS is also triggered, the MME coordinates a response message for switching from the PS to the CS and a response message for switching from the PS to the PS, and the MME combines the two messages and combines a PS transparent container and a CS transparent container, where the switch command sent by the MME to the eNodeB includes a combined transparent container. Optionally, the eNodeB adds a CSFB indication into the switch command sent to the UE. When access of the UE fails, the UE selects an available 2/3G network if the UE receives the CSFB indication.

1111: The UE accesses a GERAN/UTRAN network. The UE accesses the CS domain according to the switch command, and automatically generates a default call, that is, a call whose TI=0.

1112: The UE sends a switch completion message to a BSS/an RNS, and the BSS/the RNS sends a switch completion message to the MSC.

1113: The UE sends a paging response.

1114: The MSC triggers an authentication process.

1115: The UE and the MSC release or hold an automatically generated call whose TI=0. It may be that the UE sends a call release message or a call hold message to the MSC or the MSC sends a call release message or a call hold message to the UE. The UE and the MSC do not use the call whose TI=0.

1116: The MSC sends a CS call setup message to the UE, where the CS call setup message carries a calling number, to complete a current call.

Figure 12:
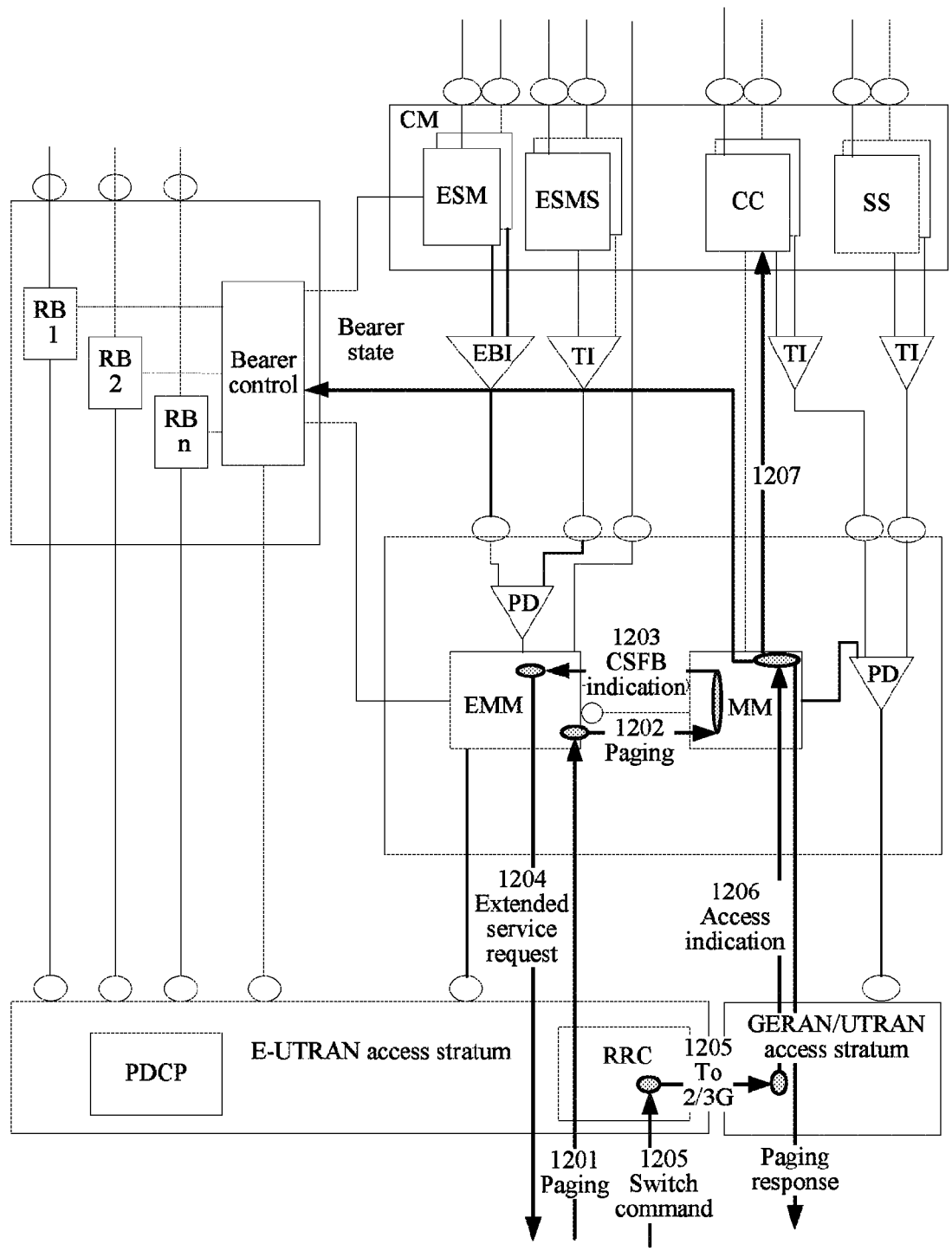
FIG. 12 is a schematic diagram of a protocol stack in a case in which a UE is called according to an embodiment of the present application.

FIG. 12 is a schematic diagram of a protocol stack in a case in which a UE is called according to an embodiment of the present application. As shown in FIG. 12, during calling:

1201: A UE receives a paging request that includes a CS domain indication.

1202: An EMM layer sends the paging request to an MM layer.

1203: The MM layer instructs the EMM layer to perform a CSFB process.

1204: The EMM layer sends an extended service request to a network, to trigger the network to fall back to a 2G or 3G network.

1205: The UE receives a switch command that includes a radio resource of a 2/3G CS domain, to access the 2/3G network. Optionally, if the UE receives a CSFB indication, when access of the UE fails, the UE selects an available 2/3G network. Specifically, an E-UTRAN access stratum (E-UTRAN Access Stratum Sublayer) forwards information about the radio resource of the 2/3G CS domain in the switch command to a GERAN/UTRAN access stratum.

1206: The GERAN/UTRAN access stratum instructs the UE at the MM layer to access the 2/3G network.

1207: Because the UE supports SRVCC, the access stratum notifies that switch is SRVCC switch, and autonomously sets up an MM connection whose TI=0. Then the MM layer sends a paging response, and continues a 2/3G CS call process.

In this embodiment of the present application, circuit switched fallback is implemented in a manner of switching by a UE from a PS domain to a CS domain. The UE releases or holds, after falling back to the circuit switched domain, a default CS call generated in a switch process, and receives a CS domain call, so that a wrong connection is avoided and a call is set up.

It should be understood that sequence numbers of the foregoing processes do not indicate execution sequences in various embodiments of the present application. The execution sequences of the processes should be determined according to functions and internal logic of the processes, and should not be construed as any limitation on the implementation processes of the embodiments of the present application.

The circuit switched fallback method according to the embodiments of the present application is described in detail in the foregoing with reference to FIG. 1 to FIG. 12, a UE, an MSC, and an MME according to the embodiments of the present application are described in the following with reference to FIG. 13 to FIG. 18.

Figure 13:
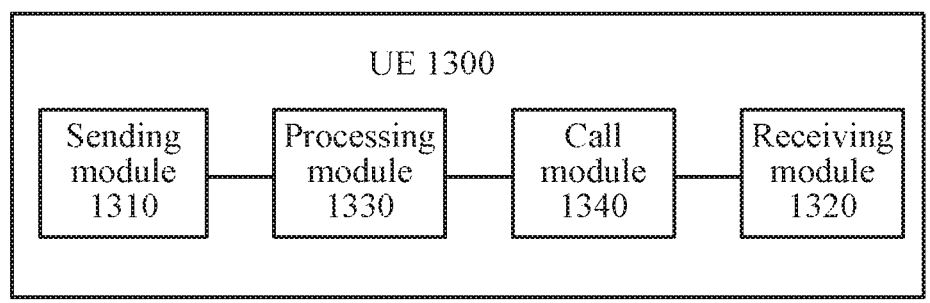
FIG. 13 is a schematic block diagram of a UE according to an embodiment of the present application.

FIG. 13 is a schematic block diagram of a UE 1300 according to an embodiment of the present application. As shown in FIG. 13, the UE 1300 includes:

a sending module 1310, configured to send, to a mobility management entity MME, a request message for requesting to perform circuit switched fallback CSFB;

a receiving module 1320, configured to receive a switch command sent by an evolved base station eNodeB, where the switch command instructs the UE to switch from a packet switched PS domain to a circuit switched CS domain;

a processing module 1330, configured to release or hold a default CS call of the UE after the UE switches to the CS domain according to the switch command, where the default CS call is generated by the UE according to the switch command; and a call module 1340, configured to, by using a mobile switching center MSC, initiate a CS call or receive a CS call.

The UE in this embodiment of the present application releases or holds, after accessing a CS domain, a default CS call generated during switch, and then initiates a CS call or receives a CS call, which can implement circuit switched fallback in a manner of switching by the UE from a PS domain to the CS domain, and reduce a delay, so that user experience can be improved.

In this embodiment of the present application, optionally, the sending module 1310 is further configured to send a call release message or a call hold message to the MSC, where the call release message or the call hold message instructs the MSC to release or hold a default CS call that is generated by the MSC in a switch preparation process.

In this embodiment of the present application, optionally, the receiving module 1320 is further configured to receive a call release message or a call hold message, where the call release message or the call hold message is sent by the MSC, and the call release message or the call hold message instructs the UE to release or hold the default CS call; and the processing module 1330 is specifically configured to release or hold the default CS call according to the call release message or the call hold message.

In this embodiment of the present application, optionally, the sending module 1310 is further configured to: before sending, to the mobility management entity MME, the request message for requesting to perform the circuit switched fallback CSFB, send a supported voice coding/decoding capability and a supported single radio voice call continuity SRVCC capability to the MME.

The UE 1300 in this embodiment of the present application may correspond to the UE in the circuit switched fallback method according to the embodiments of the present application. In addition, the foregoing and other operations and/or functions of the modules in the UE 1300 are configured to implement corresponding procedures of the methods shown in FIG. 1 to FIG. 12, which are not described again herein for brevity.

Figure 14:
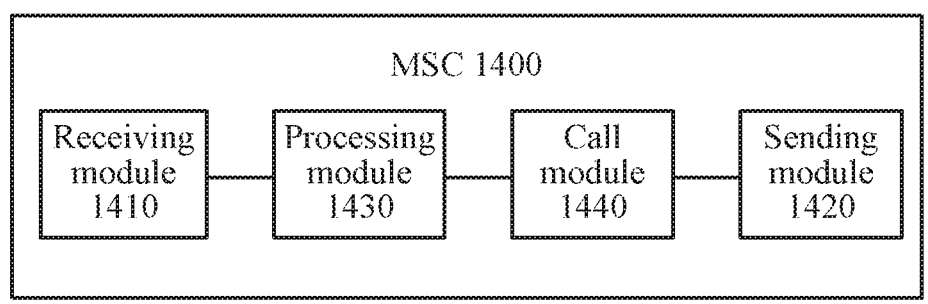
FIG. 14 is a schematic block diagram of an MSC according to an embodiment of the present application.

FIG. 14 is a schematic block diagram of an MSC 1400 according to an embodiment of the present application. As shown in FIG. 14, the MSC 1400 includes:

a receiving module 1410, configured to receive a switch request that is sent by a mobility management entity MME and used to request to switch a user equipment UE from a packet switched PS domain to a circuit switched CS domain, where the switch request carries circuit switched fallback CSFB indication information, and the CSFB indication information indicates that the switch request is sent by the MME when the MME receives a request message that is sent by the UE and used to request to perform CSFB;

a sending module 1420, configured to send a switch response message to the MME according to the switch request;

where the receiving module 1410 is further configured to receive a switch completion message sent by the UE, where the switch completion message indicates that the UE has already completed switch from the PS domain to the CS domain;

a processing module 1430, configured to release or hold a default CS call according to the CSFB indication information, where the default CS call is generated by the MSC after the MSC receives the switch request message; and a call module 1440, configured to interact with the UE, so that the UE initiates a CS call or receives a CS call.

The MSC in this embodiment of the present application releases or holds, after a UE accesses a CS domain, a default CS call generated during switch, and then sets up a new CS call for the UE, which can implement circuit switched fallback in a manner of switching by the UE from a PS domain to the CS domain, and reduce a delay, so that user experience can be improved.

In this embodiment of the present application, optionally, the receiving module 1410 is further configured to receive a call release message or a call hold message, where the call release message or the call hold message is sent by the UE, and the call release message or the call hold message instructs the MSC to release or hold the default CS call; and the processing module 1430 is specifically configured to release or hold the default CS call according to the CSFB indication information and the call release message or the call hold message.

In this embodiment of the present application, optionally, the sending module 1420 is further configured to send a call release message or a call hold message to the UE, where the call release message or the call hold message instructs the UE to release or hold a default CS call generated by the UE.

In this embodiment of the present application, optionally, the CSFB indication information is a preconfigured STN-SR.

The MSC 1400 in this embodiment of the present application may correspond to the MSC in the circuit switched fallback method according to the embodiments of the present application. In addition, the foregoing and other operations and/or functions of the modules in the MSC 1400 are configured to implement corresponding procedures of the methods shown in FIG. 1 to FIG. 12, which are not described again herein for brevity.

Figure 15:
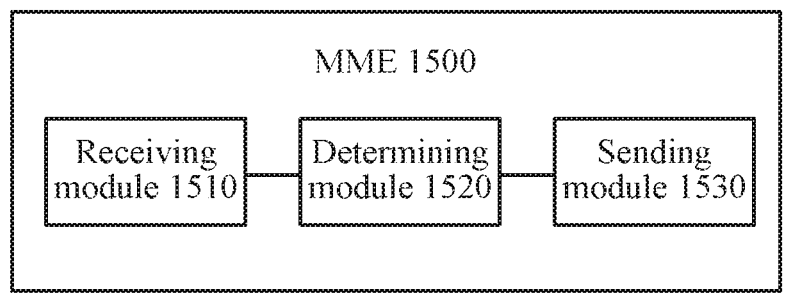
FIG. 15 is a schematic block diagram of an MME according to an embodiment of the present application.

FIG. 15 is a schematic block diagram of an MME 1500 according to an embodiment of the present application. As shown in FIG. 15, the MME 1500 includes:

a receiving module 1510, configured to receive a request message that is sent by a user equipment UE and used to request to perform circuit switched fallback CSFB;

a determining module 1520, configured to determine to switch the UE from a packet switched PS domain to a circuit switched CS domain; and a sending module 1530, configured to send an S1 interface message to an evolved base station eNodeB, where the S1 interface message instructs the eNodeB to switch the UE from the PS domain to the CS domain;

where the receiving module 1510 is further configured to receive a first switch request that is sent by the eNodeB and used to switch the UE from the PS domain to the CS domain;

the sending module 1530 is further configured to send, to an MSC, a second switch request for switching the UE from the PS domain to the CS domain, where the second switch request carries second CSFB indication information, and the second CSFB indication information indicates that the second switch request is sent to perform the CSFB;

the receiving module 1510 is further configured to receive a switch response message sent by the MSC; and the sending module 1530 is further configured to send a first switch command to the eNodeB, so that after the eNodeB receives the first switch command, the eNodeB sends a second switch command to the UE, where the second switch command instructs the UE to switch from the PS domain to the CS domain, so that after the UE switches to the CS domain according to the second switch command, the UE releases or holds a default CS call that is generated by the UE according to the second switch command.

The MME in this embodiment of the present application triggers switch from PS domain to CS domain by means of CSFB, which can implement circuit switched fallback in a manner of switching by a UE from the PS domain to the CS domain, and reduce a delay, so that user experience can be improved.

In this embodiment of the present application, optionally, the second CSFB indication information is a preconfigured STN-SR.

In this embodiment of the present application, optionally, the first switch request carries first CSFB indication information, and the first CSFB indication information indicates that the first switch request message is sent to perform the CSFB.

Optionally, the first CSFB indication information is SRVCC switch indication information.

In this embodiment of the present application, optionally, the receiving module 1510 is further configured to: before receiving the request message that is sent by the user equipment UE and used to request to perform the circuit switched fallback CSFB, receive a voice coding/decoding capability and an SRVCC capability that are sent by the UE and supported by the UE.

The MME 1500 in this embodiment of the present application may correspond to the MME in the circuit switched fallback method according to the embodiments of the present application. In addition, the foregoing and other operations and/or functions of the modules in the MME 1500 are configured to implement corresponding procedures of the methods shown in FIG. 1 to FIG. 12, which are not described again herein for brevity.

Figure 16:
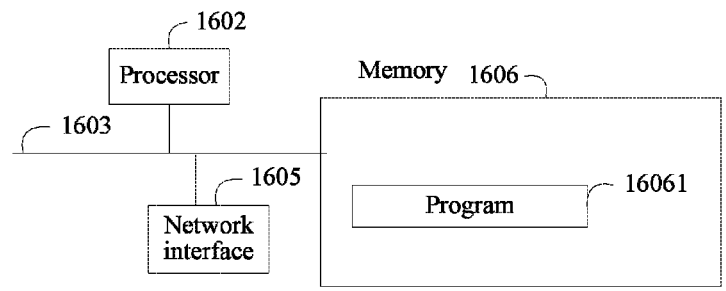
FIG. 16 is a schematic structural diagram of a UE according to an embodiment of the present application.

FIG. 16 shows a structure of a UE according to another embodiment of the present application. The UE includes at least one processor 1602 (for example, a CPU), at least one network interface 1605 or another communication interface, a memory 1606, and at least one communications bus 1603 configured to implement connection communication between these apparatuses. The processor 1602 is configured to execute an executable module, for example, a computer program, stored in the memory 1606. The memory 1606 may include a high-speed random access memory (RAM), or may include a non-volatile memory (non-volatile memory), for example, at least one magnetic disk memory. The at least one network interface 1605 (which may be wired or wireless) may be used to implement a communication connection between the system gateway and at least one another network element, and the Internet, a wide area network, a local network, a metropolitan area network, or the like may be used.

In some implementation manners, the memory 1606 stores a program 16061, where the program 16061 may be executed by the processor 1602, and the program includes:

sending, by a user equipment UE to a mobility management entity MME, a request message for requesting to perform circuit switched fallback CSFB; receiving, by the UE, a switch command sent by an evolved base station eNodeB, where the switch command instructs the UE to switch from a packet switched PS domain to a circuit switched CS domain; releasing or holding a default CS call of the UE after the UE switches to the CS domain according to the switch command, where the default CS call is generated by the UE according to the switch command; and by using a mobile switching center MSC, initiating, by the UE, a CS call or receiving a CS call.

Optionally, the program further includes: sending, by the UE, a call release message or a call hold message to the MSC, where the call release message or the call hold message instructs the MSC to release or hold a default CS call that is generated by the MSC in a switch preparation process.

Optionally, the program further includes: before the releasing or holding a default CS call of the UE, receiving, by the UE, a call release message or a call hold message, where the call release message or the call hold message is sent by the MSC, and the call release message or the call hold message instructs the UE to release or hold the default CS call; and the releasing or holding a default CS call of the UE includes: releasing or holding, by the UE, the default CS call according to the call release message or the call hold message.

Optionally, the program further includes: before the sending, by a user equipment UE to a mobility management entity MME, a request message for requesting to perform circuit switched fallback CSFB, sending, by the UE to the MME, a voice coding/decoding capability and a single radio voice call continuity SRVCC capability that are supported by the UE.

As can be seen from the foregoing technical solution provided in this embodiment of the present application, in this embodiment of the present application, a UE is triggered to switch from a PS domain to a CS domain when the UE requests CSFB; a default CS call generated during switch is released or held after the UE accesses the CS domain; and then, a CS call is initiated or a CS call is received, which can implement circuit switched fallback in a manner of switching by the UE from the PS domain to the CS domain, and reduce a delay, so that user experience can be improved.

Figure 17:
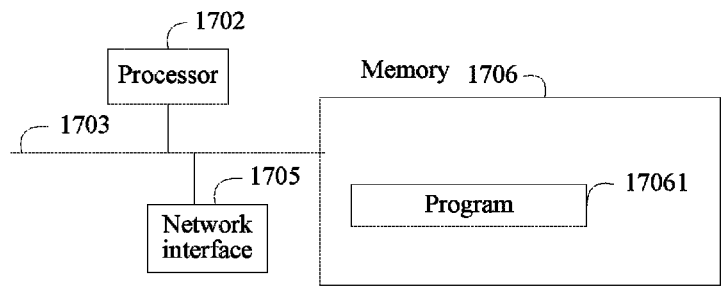
FIG. 17 is a schematic structural diagram of an MSC according to an embodiment of the present application.

FIG. 17 shows a structure of an MSC according to another embodiment of the present application. The MSC includes at least one processor 1702 (for example, a CPU), at least one network interface 1705 or another communication interface, a memory 1706, and at least one communications bus 1703 configured to implement connection communication between these apparatuses. The processor 1702 is configured to execute an executable module, for example, a computer program, stored in the memory 1706. The memory 1706 may include a high-speed random access memory (RAM), or may include a non-volatile memory (non-volatile memory), for example, at least one magnetic disk memory. The at least one network interface 1705 (which may be wired or wireless) may be used to implement a communication connection between the system gateway and at least one another network element, and the Internet, a wide area network, a local network, a metropolitan area network, or the like may be used.

In some implementation manners, the memory 1706 stores a program 17061, where the program 17061 may be executed by the processor 1702, and the program includes:

receiving, by a mobile switching center MSC, a switch request that is sent by a mobility management entity MME and used to request to switch a user equipment UE from a packet switched PS domain to a circuit switched CS domain, where the switch request carries circuit switched fallback CSFB indication information, and the CSFB indication information indicates that the switch request is sent by the MME when the MME receives a request message that is sent by the UE and used to request to perform CSFB; sending, by the MSC, a switch response message to the MME according to the switch request; receiving, by the MSC, a switch completion message sent by the UE, where the switch completion message indicates that the UE has already completed switch from the PS domain to the CS domain; releasing or holding, by the MSC, a default CS call according to the CSFB indication information, where the default CS call is generated by the MSC after the MSC receives the switch request message; and interacting, by the MSC, with the UE, so that the UE initiates a CS call or receives a CS call.

Optionally, the program further includes: before the releasing or holding a default CS call, receiving, by the MSC, a call release message or a call hold message, where the call release message or the call hold message is sent by the UE, and the call release message or the call hold message instructs the MSC to release or hold the default CS call; and the releasing or holding a default CS call includes: releasing or holding, by the MSC, the default CS call according to the CSFB indication information and the call release message or the call hold message.

Optionally, the program further includes: sending, by the MSC, a call release message or a call hold message to the UE, where the call release message or the call hold message instructs the UE to release or hold a default CS call generated by the UE.

Optionally, the enhanced CSFB indication information is a preconfigured STN-SR.

As can be seen from the foregoing technical solution provided in this embodiment of the present application, in this embodiment of the present application, a default CS call generated during switch is released or held after a UE accesses a CS domain, and then a new CS call is set up, which can implement circuit switched fallback in a manner of switching by the UE from a PS domain to the CS domain, and reduce a delay, so that user experience can be improved.

Figure 18:
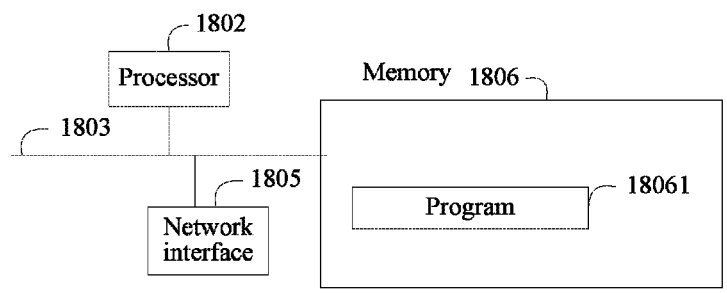
FIG. 18 is a schematic structural diagram of an MME according to an embodiment of the present application.

FIG. 18 shows a structure of an MME according to another embodiment of the present application. The MME includes at least one processor 1802 (for example, a CPU), at least one network interface 1805 or another communication interface, a memory 1806, and at least one communications bus 1803 configured to implement connection communication between these apparatuses. The processor 1802 is configured to execute an executable module, for example, a computer program, stored in the memory 1806. The memory 1806 may include a high-speed random access memory (RAM), or may include a non-volatile memory (non-volatile memory), for example, at least one magnetic disk memory. The at least one network interface 1805 (which may be wired or wireless) may be used to implement a communication connection between the system gateway and at least one another network element, and the Internet, a wide area network, a local network, a metropolitan area network, or the like may be used.

In some implementation manners, the memory 1806 stores a program 18061, where the program 18061 may be executed by the processor 1802, and the program includes:

receiving, by a mobility management entity MME, a request message that is sent by a user equipment UE and used to request to perform circuit switched fallback CSFB; sending, by the MME, an S1 interface message to an evolved base station eNodeB, where the S1 interface message instructs the eNodeB to switch the UE from a packet switched PS domain to a circuit switched CS domain; receiving, by the MME, a first switch request that is sent by the eNodeB and used to switch the UE from the PS domain to the CS domain; sending, by the MME to an MSC, a second switch request for switching the UE from the PS domain to the CS domain, where the second switch request carries second CSFB indication information, and the second CSFB indication information indicates that the second switch request is sent to perform the CSFB; receiving, by the MME, a switch response message sent by the MSC; and sending, by the MME, a first switch command to the eNodeB, so that after the eNodeB receives the first switch command, the eNodeB sends a second switch command to the UE, where the second switch command instructs the UE to switch from the PS domain to the CS domain, so that after the UE switches to the CS domain according to the second switch command, the UE releases or holds a default CS call that is generated by the UE according to the second switch command.

Optionally, the second CSFB indication information is a preconfigured STN-SR.

Optionally, the first switch request carries first CSFB indication information, and the first CSFB indication information indicates that the first switch request message is sent to perform the CSFB.

Optionally, the first CSFB indication information is SRVCC switch indication information.

Optionally, the program further includes: before the receiving, by a mobility management entity MME, a request message that is sent by a user equipment UE and used to request to perform circuit switched fallback CSFB, receiving, by the MME, a voice coding/decoding capability and an SRVCC capability that are sent by the UE and supported by the UE.

As can be seen from the foregoing technical solution provided in this embodiment of the present application, in this embodiment of the present application, switch from PS to CS is triggered by means of CSFB, which can implement circuit switched fallback in a manner of switching by a UE from the PS domain to the CS domain, and reduce a delay, so that user experience can be improved.

It should be understood that the term "and/or" in this embodiment of the present application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium, Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A user equipment (UE), comprising:
   a transmitter, configured to send, to a mobility management entity (MME), a request message for requesting to perform circuit switched fallback (CSFB);
   a receiver, configured to receive a switch command sent by an evolved base station eNodeB, wherein the switch command instructs the UE to switch from a packet switched (PS) domain to a circuit switched (CS) domain;
   a processor, configured to hold a default CS call of the UE after the UE switches to the CS domain when instructed by the switch command, configured to release the default CS call of the UE after the UE switches to the CS domain when instructed by the switch command, and configured to, by using a mobile switching center MSC, initiate a CS call or receive a CS call,
   wherein the default CS call is generated by the UE according to the switch command.

2. The UE according to claim 1, wherein the transmitter is further configured to send a call release message or a call hold message to the MSC, wherein the call release message or the call hold message instructs the MSC to release or hold a default CS call that is generated by the MSC in a switch preparation process.

3. The UE according to claim 1, wherein the receiver is further configured to receive a call release message or a call hold message, wherein the call release message or the call hold message is sent by the MSC, and the call release message or the call hold message instructs the UE to release or hold the default CS call; and
   the processor is configured to release or hold the default CS call according to the call release message or the call hold message.

4. The UE according to claim 1, wherein the transmitter is further configured to: before sending, to the MME, the request message for requesting to perform the CSFB, send a supported voice coding/decoding capability and a supported single radio voice call continuity (SRVCC) capability to the MME.

5. A mobile switching center (MSC), comprising:
   a receiver, configured to receive a switch request that is sent by a mobility management entity (MME) and used to request to switch a user equipment (UE) from a packet switched (PS) domain to a circuit switched (CS) domain, wherein the switch request carries circuit switched fallback (CSFB) indication information, and the CSFB indication information indicates that the switch request is sent by the MME when the MME receives a request message that is sent by the UE and used to request to perform CSFB;
   a transmitter, configured to send a switch response message to the MME according to the switch request;
   wherein the receiver is further configured to receive a switch completion message sent by the UE, wherein the switch completion message indicates that the UE has already completed switch from the PS domain to the CS domain;
   a processor, configured to hold a default CS call when instructed by the CSFB indication information, configured to release the default CS call when instructed by the CSFB indication information, and configured to interact with the UE, so that the UE initiates a CS call or receives a CS call, wherein the default CS call is generated by the MSC after the MSC receives the switch request message.

6. The MSC according to claim 5, wherein the receiver is further configured to receive a call release message or a call hold message, wherein the call release message or the call hold message is sent by the UE, and the call release message or the call hold message instructs the MSC to release or hold the default CS call; and the processor is configured to release or hold the default CS call according to the CSFB indication information and the call release message or the call hold message.

7. The MSC according to claim 5, wherein the transmitter is further configured to send a call release message or a call hold message to the UE, wherein the call release message or the call hold message instructs the UE to release or hold a default CS call generated by the UE.

8. The MSC according to claim 5, wherein the CSFB indication information is a preconfigured session transfer number-a single receiver for single radio voice call continuity (SRVCC STN-SR).

9. A mobility management entity (MME), comprising:
a receiver, configured to receive a request message that is sent by a user equipment (UE) and used to request to perform circuit switched fallback (CSFB);
a process, configured to determine to switch the UE from a packet switched (PS) domain to a circuit switched (CS) domain; and
a transmitter, configured to send an S1 interface message to an evolved base station (eNodeB), wherein the S1 interface message instructs the eNodeB to switch the UE from the PS domain to the CS domain;
wherein the receiver is further configured to receive a first switch request that is sent by the eNodeB and used to switch the UE from the PS domain to the CS domain;
the transmitter is further configured to send, to a mobile switching center MSC, a second switch request for switching the UE from the PS domain to the CS domain, wherein the second switch request carries second CSFB indication information, and the second CSFB indication information indicates that the second switch request is sent to perform the CSFB;
the receiver is further configured to receive a switch response message sent by the MSC; and
the transmitter is further configured to send a first switch command to the eNodeB, so that after the eNodeB receives the first switch command, the eNodeB sends a second switch command to the UE, wherein the second switch command instructs the UE to switch from the PS domain to the CS domain, so that after the UE switches to the CS domain according to the second switch command, the UE holds a default CS call that is generated by the UE when instructed by the second switch command and the UE releases the default CS call that is generated by the UE when instructed by the second switch command.

10. The MME according to claim 9, wherein the second CSFB indication information is a preconfigured session transfer number-a single receiver for single radio voice call continuity (SRVCC STN-SR).

11. The MME according to claim 9, wherein the first switch request carries first CSFB indication information, and the first CSFB indication information indicates that the first switch request message is sent to perform the CSFB.

12. The MME according to claim 11, wherein the first CSFB indication information is a single receiver for single radio voice call continuity (SRVCC) switch indication information.

13. The MME according to claim 9, wherein the receiver is further configured to: before receiving the request message that is sent by the UE and used to request to perform the CSFB, receive a voice coding/decoding capability and a single receiver for single radio voice call continuity capability (SRVCC) that are sent by the UE and supported by the UE.

* * * * *